(12) United States Patent
Mahmoud et al.

(10) Patent No.: US 10,523,904 B2
(45) Date of Patent: Dec. 31, 2019

(54) VEHICLE DATA RECORDING SYSTEM

(71) Applicant: MAGNA ELECTRONICS INC., Auburn Hills, MI (US)

(72) Inventors: Hossam Mahmoud, Goethestr (DE); Christian Traub, Windach (DE); Arno Krapf, Darmstadt (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/380,438

(22) Filed: Apr. 10, 2019

(65) Prior Publication Data
US 2019/0238799 A1    Aug. 1, 2019

Related U.S. Application Data

(63) Continuation of application No. 14/169,329, filed on Jan. 31, 2014, now abandoned.

(60) Provisional application No. 61/893,489, filed on Oct. 21, 2013, provisional application No. 61/760,364, filed on Feb. 4, 2013.

(51) Int. Cl.
*H04N 7/18* (2006.01)
*H04N 5/232* (2006.01)
*B60R 1/00* (2006.01)

(52) U.S. Cl.
CPC ............ *H04N 7/181* (2013.01); *B60R 1/00* (2013.01); *H04N 5/23241* (2013.01); *H04N 5/23245* (2013.01); *B60R 2300/30* (2013.01)

(58) Field of Classification Search
CPC .............. H04N 7/181; H04N 5/23245; H04N 5/23241; B60R 1/00; B60R 2300/30
See application file for complete search history.

(56) References Cited

U.S. PATENT DOCUMENTS

| | | |
|---|---|---|
| 4,987,357 A | 1/1991 | Masaki |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,059,877 A | 10/1991 | Teder |
| 5,086,253 A | 2/1992 | Lawler |

(Continued)

FOREIGN PATENT DOCUMENTS

WO    2013081985 A1    6/2013

*Primary Examiner* — Sath V Perungavoor
*Assistant Examiner* — Boubacar Abdou Tchoussou
(74) *Attorney, Agent, or Firm* — Honigman LLP

(57) ABSTRACT

A vision system for a vehicle includes at least one camera having a field of view exterior the vehicle. An image processor is operable to process image data captured by the camera. When the vehicle is parked, a control controls the camera to capture frames of image data at a first capture rate. The control compares a frame of captured imaged data to at least one previous frame of captured image data. Responsive to the comparison determining a change in the frames of captured image data beyond a threshold degree of change, (i) the control increases the capture rate to a second capture rate, (ii) the at least one camera captures frames of image data at the second capture rate and (iii) the control activates a recording device to record images captured by the camera at the second capture rate.

23 Claims, 27 Drawing Sheets

(56) References Cited

U.S. PATENT DOCUMENTS

| | | |
|---|---|---|
| 5,096,287 A | 3/1992 | Kakinami et al. |
| 5,097,362 A | 3/1992 | Lynas |
| 5,121,200 A | 6/1992 | Choi |
| 5,130,709 A | 7/1992 | Toyama et al. |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,614,788 A | 3/1997 | Mullins |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,201,642 B1 | 3/2001 | Bos |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,553,130 B1 | 4/2003 | Lemelson et al. |
| 6,594,583 B2 | 7/2003 | Ogura et al. |
| 6,611,610 B1 | 8/2003 | Stam et al. |
| 6,636,258 B2 | 10/2003 | Strumolo |

(56) References Cited

U.S. PATENT DOCUMENTS

| | | |
|---|---|---|
| 6,672,731 B2 | 1/2004 | Schnell et al. |
| 6,690,268 B2 | 2/2004 | Schofield et al. |
| 6,704,621 B1 | 3/2004 | Stein et al. |
| 6,711,474 B1 | 3/2004 | Treyz et al. |
| 6,735,506 B2 | 5/2004 | Breed et al. |
| 6,744,353 B2 | 6/2004 | Sjonell |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,013,780 B2 | 9/2011 | Lynam |
| 8,027,029 B2 | 9/2011 | Lu et al. |
| 8,258,932 B2 | 9/2012 | Wahlstrom |
| 8,849,495 B2 | 9/2014 | Chundrik, Jr. et al. |
| 9,681,125 B2 * | 6/2017 | Wang .................. H04N 19/00 |
| 2002/0015153 A1 | 2/2002 | Downs |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0016870 A1 | 1/2004 | Pawlicki et al. |
| 2004/0114381 A1 | 6/2004 | Salmeen et al. |
| 2004/0212678 A1 | 10/2004 | Cooper et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0290479 A1 | 12/2006 | Akatsuka et al. |
| 2007/0104476 A1 | 5/2007 | Yasutomi et al. |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0020170 A1 | 1/2010 | Higgins-Luthman et al. |
| 2010/0198513 A1 | 8/2010 | Zeng et al. |
| 2010/0228437 A1 | 9/2010 | Hanzawa et al. |
| 2010/0265344 A1 | 10/2010 | Velarde et al. |
| 2011/0148609 A1 | 6/2011 | Dabholkar et al. |
| 2012/0044066 A1 | 2/2012 | Mauderer et al. |
| 2012/0062743 A1 | 3/2012 | Lynam et al. |
| 2012/0105635 A1 | 5/2012 | Erhardt et al. |
| 2012/0218412 A1 | 8/2012 | Dellantoni et al. |
| 2012/0262340 A1 | 10/2012 | Hassan et al. |
| 2012/0268601 A1 | 10/2012 | Yeh et al. |
| 2013/0124052 A1 | 5/2013 | Hahne |
| 2013/0129150 A1 | 5/2013 | Saito |
| 2013/0131918 A1 | 5/2013 | Hahne |
| 2013/0141597 A1 | 6/2013 | Lee et al. |
| 2013/0170557 A1 * | 7/2013 | Wang .................. H04N 19/00 375/240.24 |
| 2014/0067206 A1 | 3/2014 | Pflug |
| 2014/0156157 A1 | 6/2014 | Johnson et al. |
| 2014/0192206 A1 | 7/2014 | Holz |
| 2014/0207344 A1 | 7/2014 | Ihlenburg et al. |
| 2014/0218529 A1 | 8/2014 | Mahmoud et al. |
| 2014/0222280 A1 | 8/2014 | Salomonsson et al. |
| 2014/0313339 A1 | 10/2014 | Diessner |
| 2014/0375476 A1 | 12/2014 | Johnson et al. |
| 2014/0379233 A1 | 12/2014 | Chundrlik, Jr. et al. |
| 2015/0009010 A1 | 1/2015 | Biemer |

\* cited by examiner

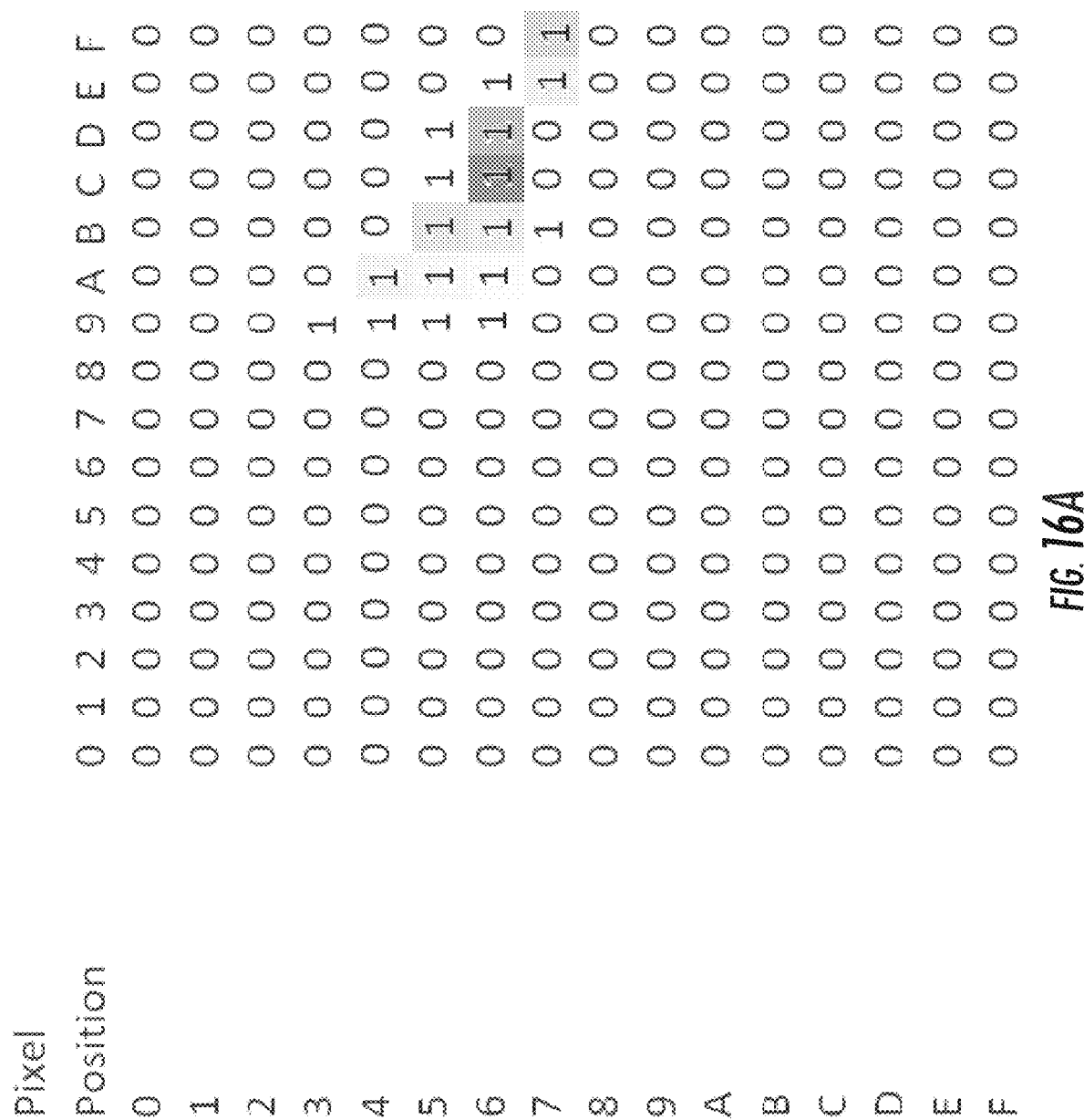

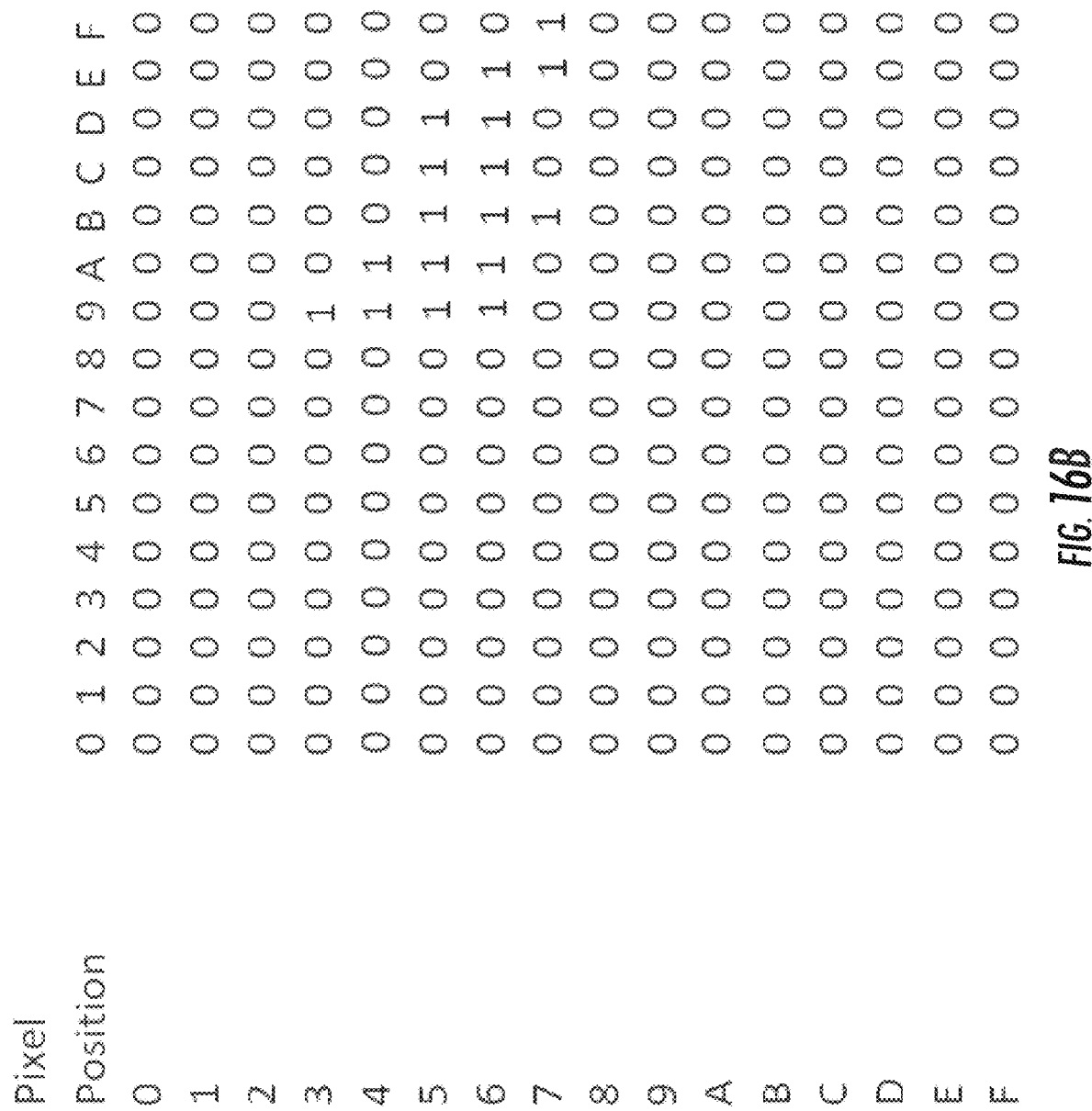

FIG. 17A

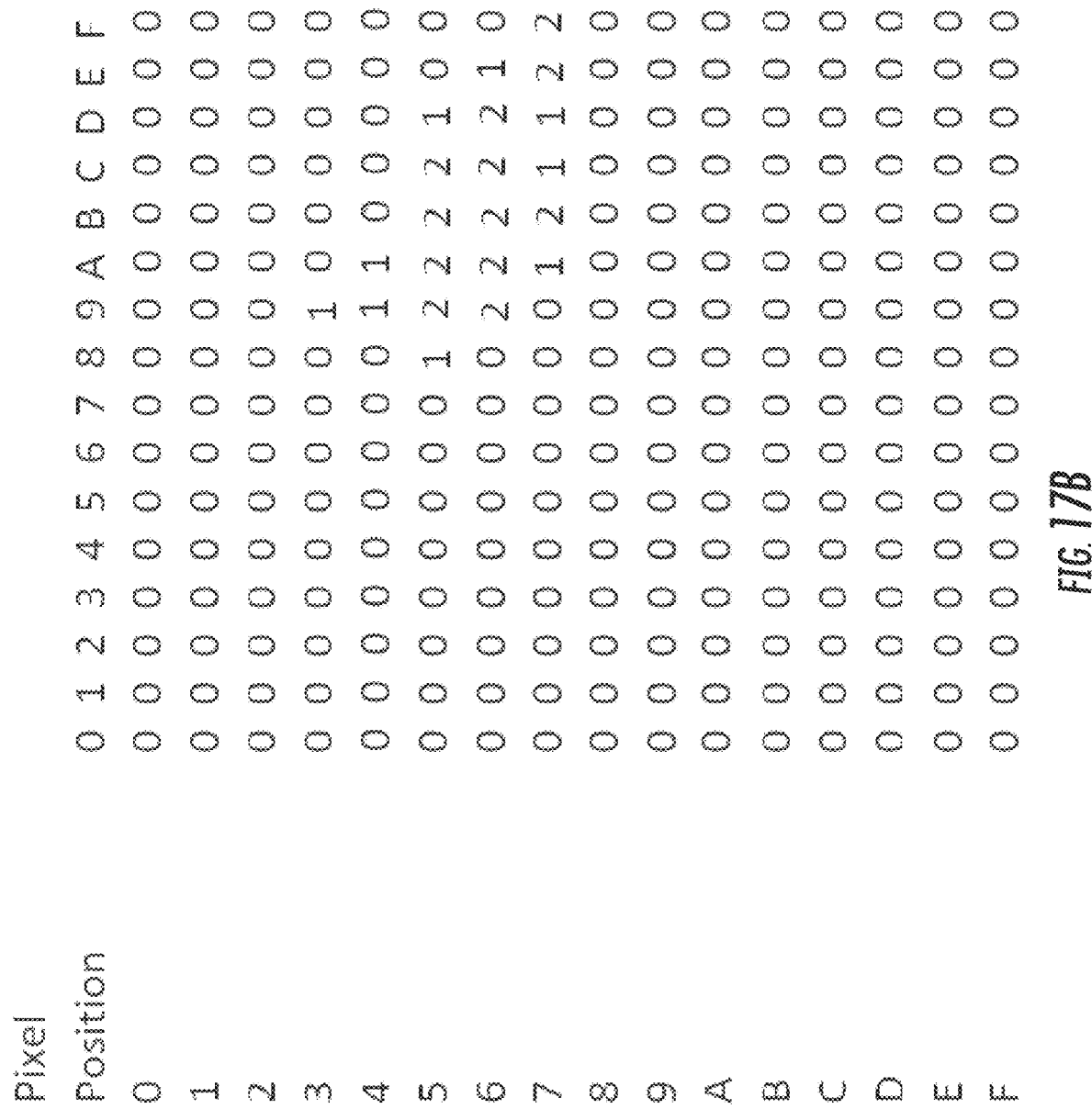

FIG. 20

VEHICLE DATA RECORDING SYSTEM

CROSS REFERENCE TO RELATED APPLICATIONS

The present application is a continuation of U.S. patent application Ser. No. 14/169,329, filed Jan. 31, 2014, which claims the filing benefits of U.S. provisional applications, Ser. No. 61/893,489, filed Oct. 21, 2013, and Ser. No. 61/760,364, filed Feb. 4, 2013, which are hereby incorporated herein by reference in their entireties.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides communication/data signals, including camera data or image data that may be displayed or processed to provide the desired display images and/or processing and control, depending on the particular application of the camera and vision or imaging system. The present invention provides a vehicle data recording system that is operable to record data captured by one or more cameras or image-based sensors and/or one or more other sensors or non-image based sensors of the vehicle. The system of the present invention provides a triggering means to trigger or initiate data capture for a parked vehicle in a manner that captures data responsive to a triggering event indicative of a change in the scene at or around the vehicle.

According to an aspect of the present invention, a vision system for a vehicle includes at least one camera disposed at a vehicle equipped with the vehicle vision system. The at least one camera has a field of view exterior the equipped vehicle and is operable to capture image data. An image processor is operable to process image data captured by the at least one camera and a data recording device is operable to record image data captured by the at least one camera. A control controls operation of the at least one camera and, responsive to a determination that the equipped vehicle is in a parked state, the control controls the at least one camera to capture frames of image data at a first capture rate. Responsive to image processing of captured image data, the control compares a frame of captured imaged data to at least one previous frame of captured image data. Responsive to the comparison determining a change in the frames of captured image data beyond a threshold degree of change, (i) the control increases the capture rate to a second capture rate, (ii) the at least one camera captures frames of image data at the second capture rate and (iii) the control activates the data recording device to record the images captured at the second capture rate.

Thus, the present invention periodically or episodically captures frames of image data and processes the captured image data to determine when a threshold degree of change occurs in the scene being monitored by the camera (such as when a person walks by or up to the parked vehicle). When such a threshold degree of change occurs, the system increases the rate of capture (such as from capturing one frame every second or every five seconds or the like to capturing at least 20 frames per second or at least 30 frames per second or the like) and records the captured image data (such as captured video image data) on the data recording device. Thus, the system reduces the power consumption of the parked vehicle by episodically capturing image data at a slower rate and only captures video images and activates the data recording device when the system determines that there is a threshold or significant change in the frames of image data captured by the camera or cameras.

These and other objects, advantages, purposes and features of the present invention will become apparent upon review of the following specification in conjunction with the drawings.

BRIEF DESCRIPTION OF THE DRAWINGS

FIGS. 16A-17B show counter tables and triggerings that may occur due to a waving branch such as like that shown in FIGS. 13 and 14;

FIG. 20 is a chart showing sensitivity modes for the data recording system of the present invention as implemented on an electrical vehicle or the like;

DESCRIPTION OF THE PREFERRED EMBODIMENTS

A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver.

Figure 1:
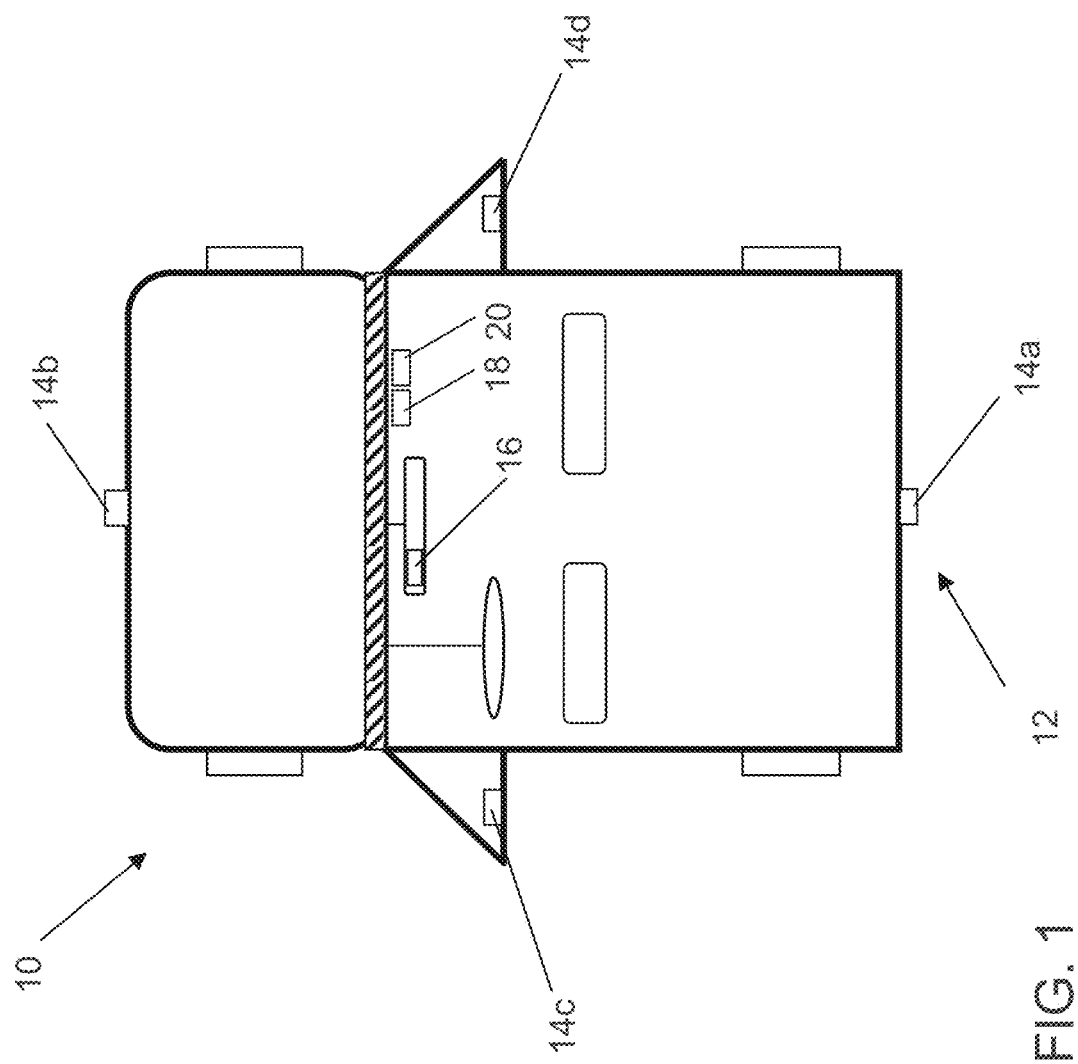
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

Vehicles are often equipped with cameras and other environmental sensors. Such cameras and/or sensors are typically deactivated or off or in a sleep mode when the vehicle is parked and turned off in order to save energy and reduce electrical power consumption. Some systems of a vehicle may stay awake when the vehicle is parked or may stay partially/intermittently/periodically awake when the vehicle is parked or may be awakable or episodically awakable, such as responsive to an external trigger or the like, such as a vehicle door lock system or vehicle alarm system or the like.

The vehicle data or damage recording system of the present invention uses the on board cameras and environmental sensors of an equipped vehicle to record the scene at or around the equipped vehicle at a time when (or just before) the vehicle is hit by another vehicle, animal or person. The system of the present invention thus uses the camera or cameras already present on the vehicle. For example, the camera or cameras used by the recording system may be part of a multi-camera vision system or surround view system or rear backup aid system or forward facing camera system of the vehicle (and may utilize aspects of the systems described in U.S. Pat. No. 7,855,755, which is hereby incorporated herein by reference in its entirety). Such use of cameras already present on the vehicle for other purposes reduces the cost of the recording system, since no dedicated cameras are needed for the recording system when the recording system is added to the vehicle.

The system includes a recording device 18 recording device operable to record images captured by at least one vehicle camera, and also includes a control 20 that controls operation of the at least one camera. Employment of an advanced wake up algorithm allows the system to record the environmental scene before the vehicle is hit. The present invention thus may provide identification of the opponent or collider or the opponent's license plate or the like, such as in "hit-and-run" situations or the like.

At the time the equipped vehicle identifies that it may likely be hit or was hit, the system of the vehicle may start to record the environmental scene. The system may record image data captured by some or all of the vehicle installed cameras (and/or remote cameras within a communication range of the equipped vehicle (such as with a X2Car communication range), such as traffic monitoring cameras at intersections or security cameras at buildings, parking lots and/or the like). Optionally, outputs of other environmental sensors of the vehicle, such as ultrasound sensors, capacitive proximity sensors, touch sensors, heartbeat sensors (such as sensors utilizing aspects of the sensors and systems described in U.S. Pat. No. 8,258,932, which is hereby incorporated herein by reference in its entirety), RADAR sensors, LADAR sensors, LIDAR sensors, time of flight (TOF) sensors, structured light sensors and/or infrared sensors or the like, may be engaged and may be recorded as well.

The trigger that the vehicle was (or imminently may be) hit or damaged may come from a vehicle alarm system, which may include or may be responsive to sensors for vibration, level changing, glass breaking, unauthorized door or ignition lock actuation or compartment ultrasound disturbances and/or the like.

Optionally, the data recording system of the present invention may include or utilize a sensing system that uses capacitive sensors, which may be installed in or at the rear bumper of the vehicle and/or the door handles of the vehicle (and typically operable to detect a person's hand at the door handle to open the vehicle door), but are not exclusively for triggering the recording system or the vehicle alarm system.

Figure 4:
FIG. 4 is an image showing the initial environmental scene at the time the vehicle is parked.

Alternatively, or in addition to such capacitive sensors, the trigger may be achieved by the image processing devices of the vehicle that are operable to process image data captured by the vehicle camera or cameras. Such image processing devices may take reference images from the environmental scene at the time the vehicle is parked, such as shown in FIG. 4. The object detection may determine non-moving or steady objects that are within detection range or field of view of the camera or cameras. The image data representative of the scene and/or the images of the scene may be stored as an initial reference (such as, for example, the image shown in FIG. 4). Other sensor data, such as the distance or level (to anything in the vehicle's environment) detected by different ultrasound sensors may be stored as well. In order to keep the electrical power consumption low, the system may operate to wake up in a cyclical pattern.

Figure 3:
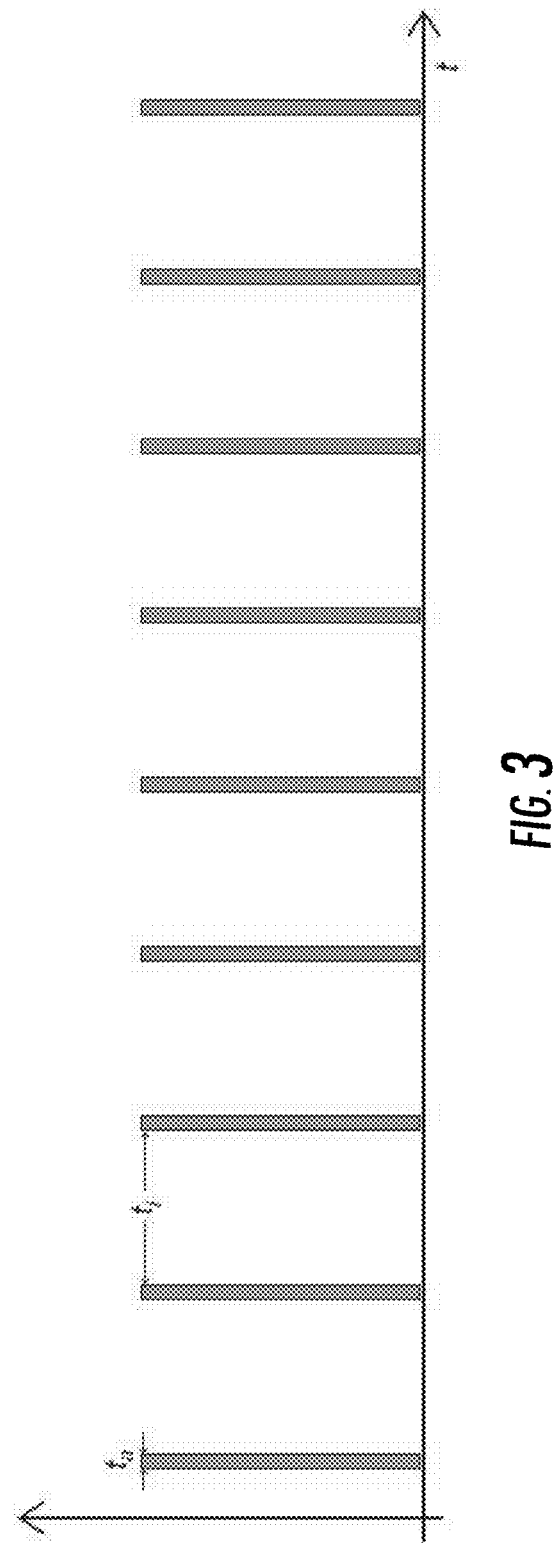
FIG. 3 is a chart showing a time pattern for the cyclical wake up and sleep pattern for the data recording system of the present invention.

FIG. 3 shows a typical time pattern for the cyclical wake up and sleep pattern for the system of the present invention. As shown in FIG. 3, there are active or awake time phases to and inactive or asleep time phases $t_i$. For saving electrical energy of the vehicle's battery, the inactive phases are meant to be much longer than the active phases. Optionally, and desirably, the system may reduce or shut off as much power consumption as possible during the inactive time phases. Thus, it is envisioned that the life time of some components may be reduced due to excessive restarting or rebooting. Also, the initialization time of some image processing functional components may be comparably long so a shorter shut off time period may not be suitable. The imager, controllers and static memory components may suffer the most. Thus, the present invention preferably provides a good or acceptable balance by keeping the imager operating and avoiding the need of the processing unit except to run cyclically for the recording system, mostly on a field-programmable gate array (FPGA).

Figure 2:
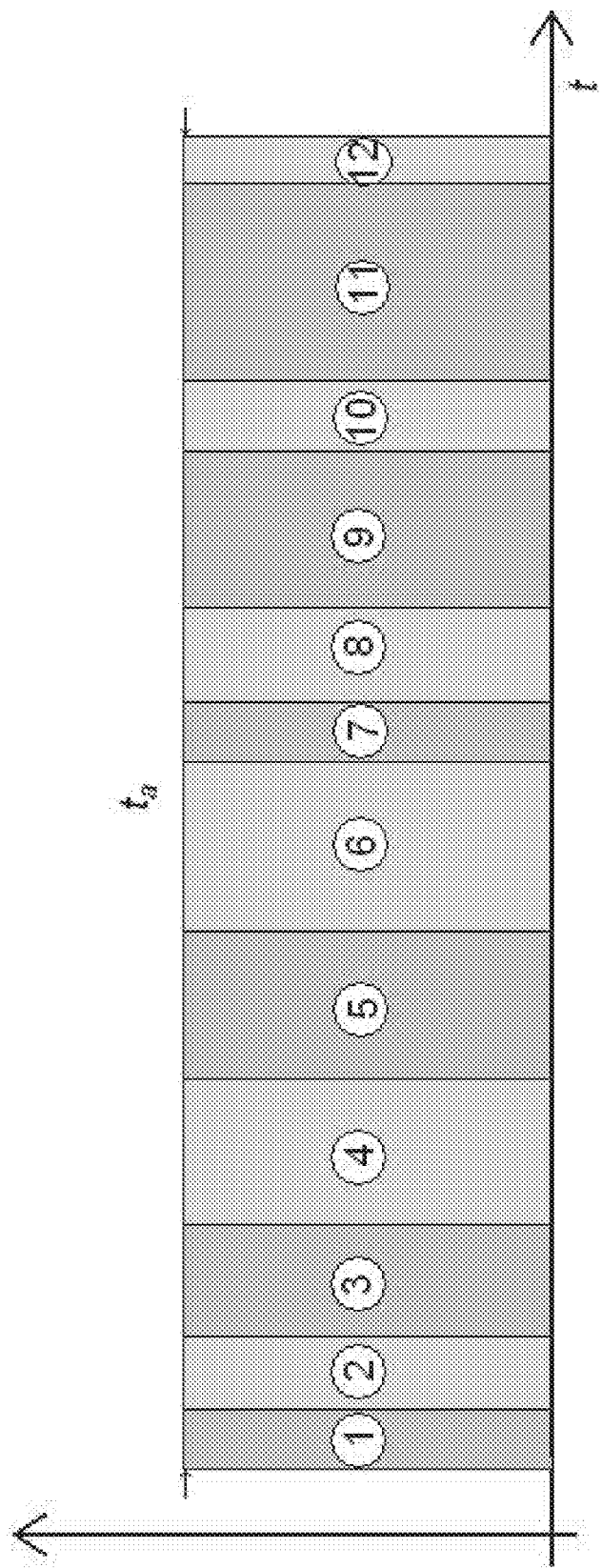
FIG. 2 is a chart showing the processing steps that the data recording system of the present invention undergoes at an activating time $t_a$.

The data recording system may comprise one or more excitation status flags or state machines, the states of which equate to elapsed time, the environmental input and battery charge status. At cyclical wake ups, the system may enter an active or awake time phase $t_a$, and may activate the vehicle cameras, the environmental sensors and the image processing device such as in the example shown in FIG. 2. In such an example, the processing steps may be:

(1) wake up;
(2) initialize camera(s);
(3) capture image(s);
(4) transfer image (to processing unit if not processed locally in camera);
(5) filter image (Gaus filter/Box filter/Masaicing);
(6) load compare image (if not temporarily stored earlier);
(7) calculate difference image (or other suitable object detection);
(8) load ignore mask table;
(9) decide whether to initiate recording mode (video image capturing)→jump to recording procedure (and exit the cyclical wake up mode);
(10) update ignore mask table;
(11) store image; and
(12) enter sleep phase ($t_i$).

The captured data may initially or provisionally be stored local or at the vehicle. The storage media and the vehicle communication bus (such as, for example, a vehicle CAN bus or a vehicle LIN bus or the like) may stay asleep if not awakened or activated by entering a higher excitation state, which may be triggered by the object detection algorithm or when the local storage memory is nearly full (and not able to conceive another image capture data set). When awake (time phases $t_a$), the data recording system may capture several images or video images or a movie, preferably capturing at least one image from one or more cameras (including remote cameras), and/or optionally the system may fetch or capture or determine a status of one or more external sensors and may compare these to earlier captured data sets. By cyclically taking just one image at a time (such as by capturing frames of image data with a selected or determined period of time between captures, such as, for example, less than or equal to about ten frames per second (fps) or about five fps about one fps or about 0.2 fps (one frame every five seconds) or about 0.1 fps (one frame every ten seconds) or one frame per minute or one frame per five minutes or any selected capture rate or time interval or period, a time lapse video develops of the scene encompassed by that camera's field of view. That time lapse video records the good or no-change case, when no disturbances happened nearby the parked vehicle. The time lapse may differ by the chosen wake up time gaps or time periods between image captures.

The data captured may be stored in a FIFO memory at which the oldest part of the lapse video and optionally other sensor data may be overwritten by the newer ones in cases where no vehicle alarm occurs, or alternatively the captured data may be stored in a memory device (in all cases), and the system may periodically back up the stored data and/or may transfer the stored data from a local memory device (such as a vision system or vehicle inherent memory device such as like a flash memory or solid state drive, which may be exchangeable by the vehicle owner) to a remote or external memory device (such as via a telematics system or other communication or data transfer system). The captured images or video and optionally other sensor data may be stored/transferred in a compressed data format or as RAW or may be stored in RAW locally and transferred compressed or may be stored compressed locally and transferred in RAW. In cases where the system employs an object detection algorithm, the system may store images in the area or areas of moving objects and/or regions of interest in a high definition and/or uncompressed format, and the system may store images in other areas or parts of less interest at or surrounding the vehicle in a low definition or compressed format for shrinking the data size for storing or transmission.

The backup and storage modes or means may be customizable by the vision system manufacturer, the OEM, the dealership, third party services or the owner of the vehicle, and the system may communicate a message or alert (optionally a text message or the like or a video message or still photo or image message or the like) to the driver or owner of the vehicle (such as to the driver's cell phone or PDA or the like) in response to a triggering event occurring. Accordingly, viewing-programs or apps may be provided by the vehicle or vision system manufacturer or vendors or by aftermarket distributers. These may provide additional services such as a function to automatically guide the police to the vehicle by the driver's request (such as via his or her cell phone or PDA program or app).

Figure 5:
FIG. 5 is an image showing the environmental scene at a later time after the vehicle is parked.

An object detection (OD) algorithm or feature extractor (such as one that may be based on optical flow, difference images or edge detection, such as Lucas Kanade, Zobel, Laplace or such as FAST or the like) may also be employed for comparing whether objects have entered the scene (such as shown in FIG. 5, where two people are walking by the vehicle) that weren't present earlier (see FIG. 4) or which have moved since the last wake up phase. To detect humans within an image there may be classifiers in use such as like 'Viola Jones', 'Fastest Pedestrian Detector in the West' or HOG (Histogram of Orientated Gradients) or the like. This is the 'positive' or changed case, which leads to a sensor wake up mode according to state (9) in FIG. 2. When a signal is generated indicative of a determined threshold change in the frames of captured image data, the control increases the frequency or frame capture rate of the camera (reduces the time period between frame captures), such as to greater than or equal to about ten fps or about twenty fps or about thirty fps or any other selected rate or frequency or capture rate) and activates or controls the recording device to record the captured image data and store the captured image data.

Figure 6:
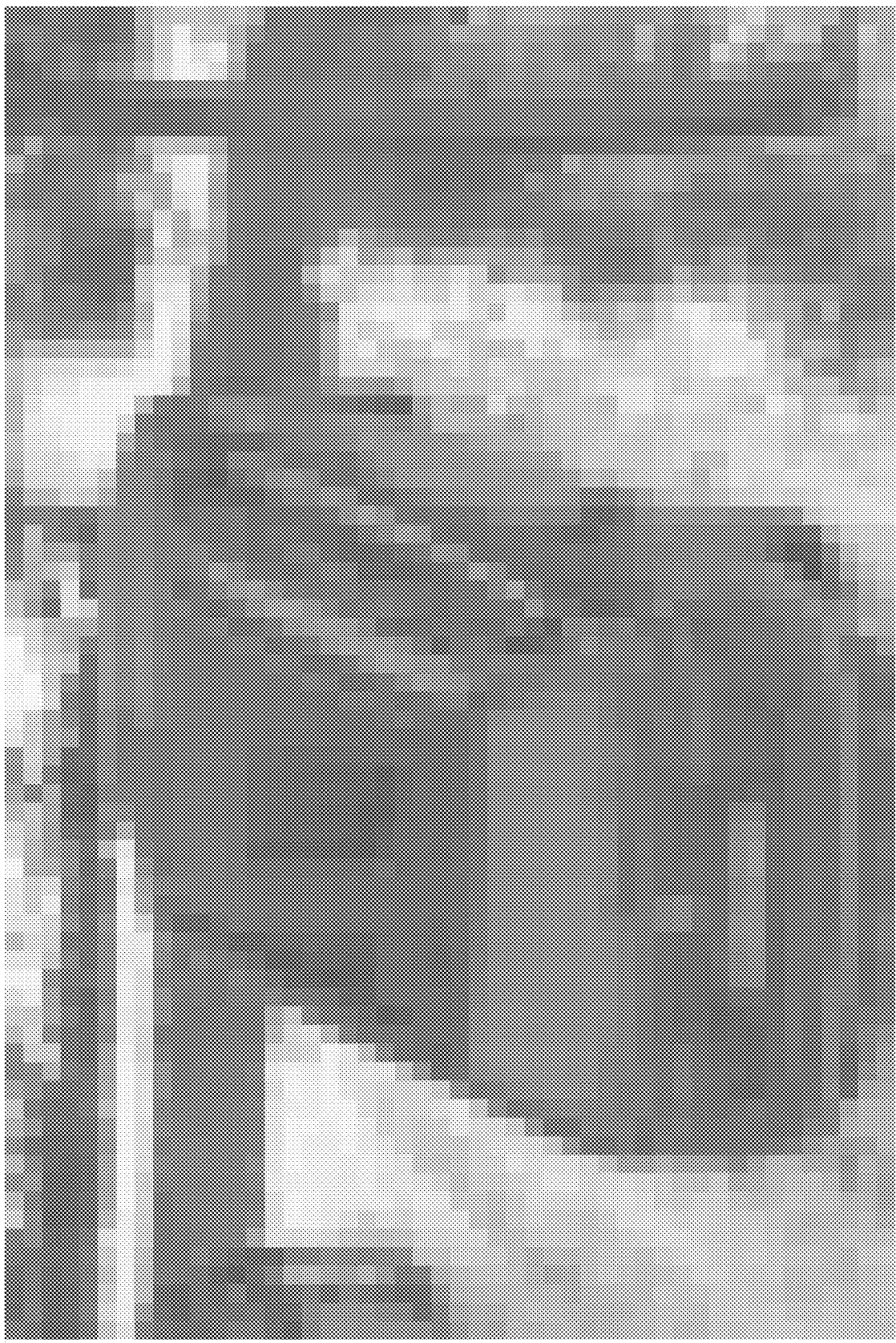
FIG. 6 shows the scene or image of FIG. 4 when mosaiced in accordance with the present invention.
Figure 7:
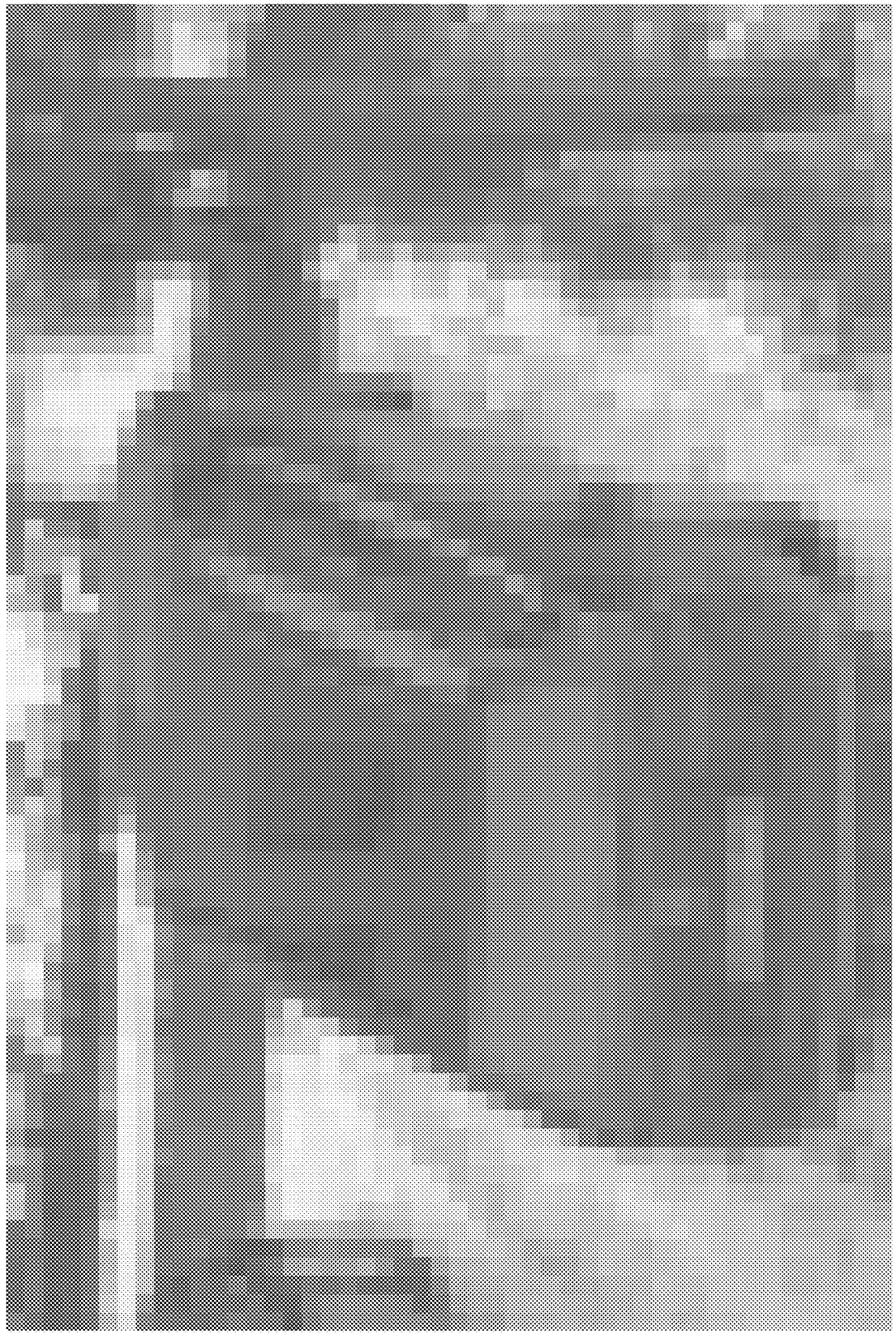
FIG. 7 shows the scene or image of FIG. 5 when mosaiced in accordance with the present invention.
Figure 8:
FIG. 8 shows the result when calculating the difference between the images of FIGS. 7 and 6 (the image in FIG. 8 was inverted for clarity) in accordance with the present invention.

A simple and practical embodiment of an OD may be to use an image difference procedure. To shrink the to-be-compared image properties, the images may be additionally processed by a mosaicing filter, a Gaussian filter or a box filter or the like (see step 5 in FIG. 2) before difference calculating (see step 7 in FIG. 2). FIG. 6 shows the scene or image of FIG. 4 when mosaiced and FIG. 7 shows the scene or image of FIG. 5 when mosaiced. FIG. 8 shows the result when calculating the difference between the images of FIGS. 7 and 6 (for better readability herein the image in FIG. 8 was inverted, the feature information with images does not change by that).

Figure 9A:
FIG. 9A shows the image of FIG. 8, with the brightness of some of the different pixels/areas marked by inclining numbers in accordance with the present invention.
Figure 9B:
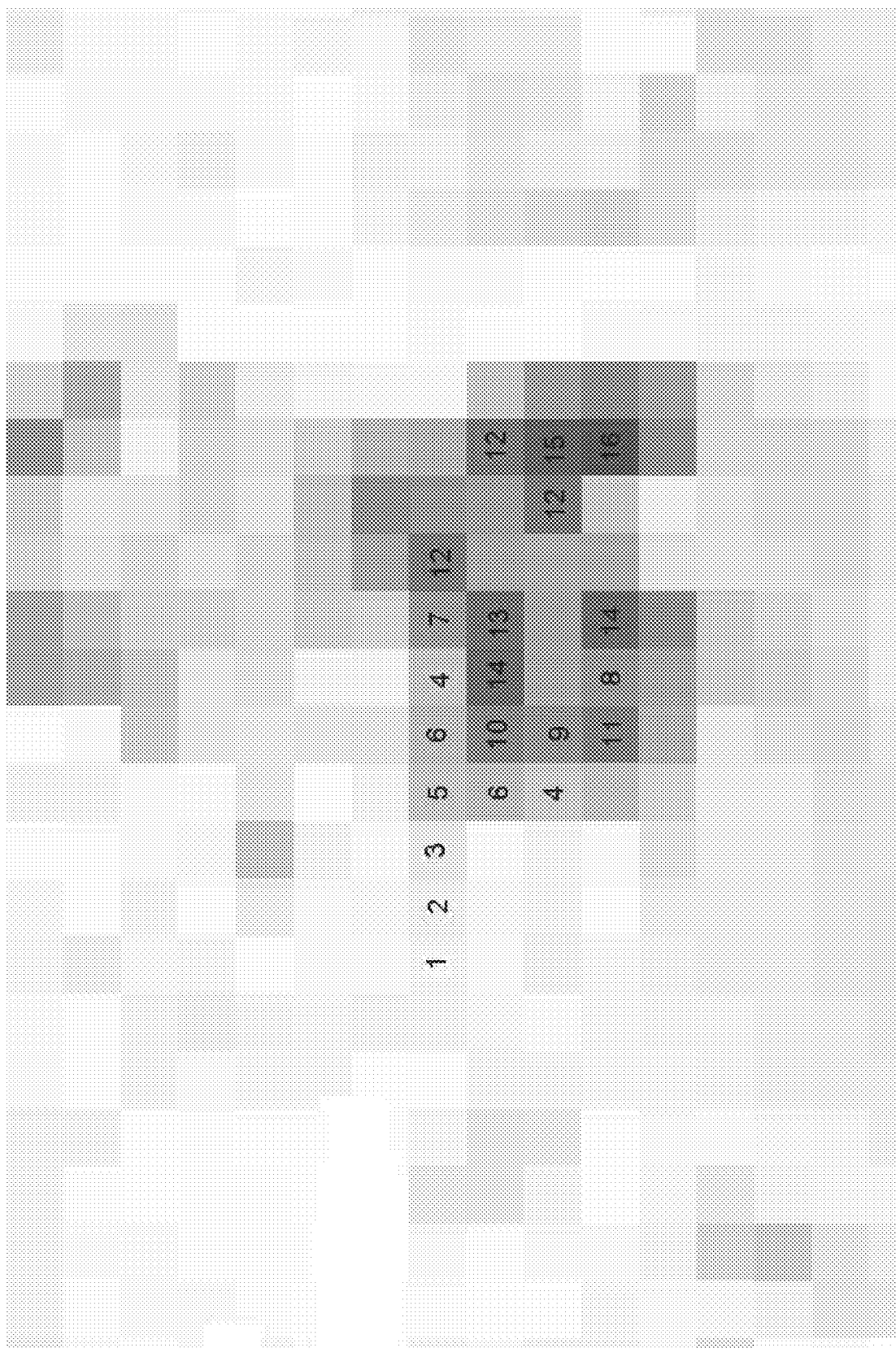
FIG. 9B is a sectional cut out of the image of FIG. 9A, with the different pixels/areas enlarged in accordance with the present invention.
Figure 10A:
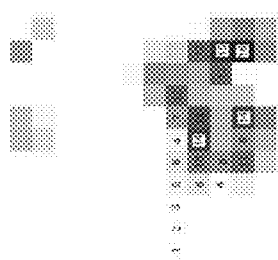
FIG. 10A is the image of FIG. 9A after a contrast enhancement.
Figure 10B:
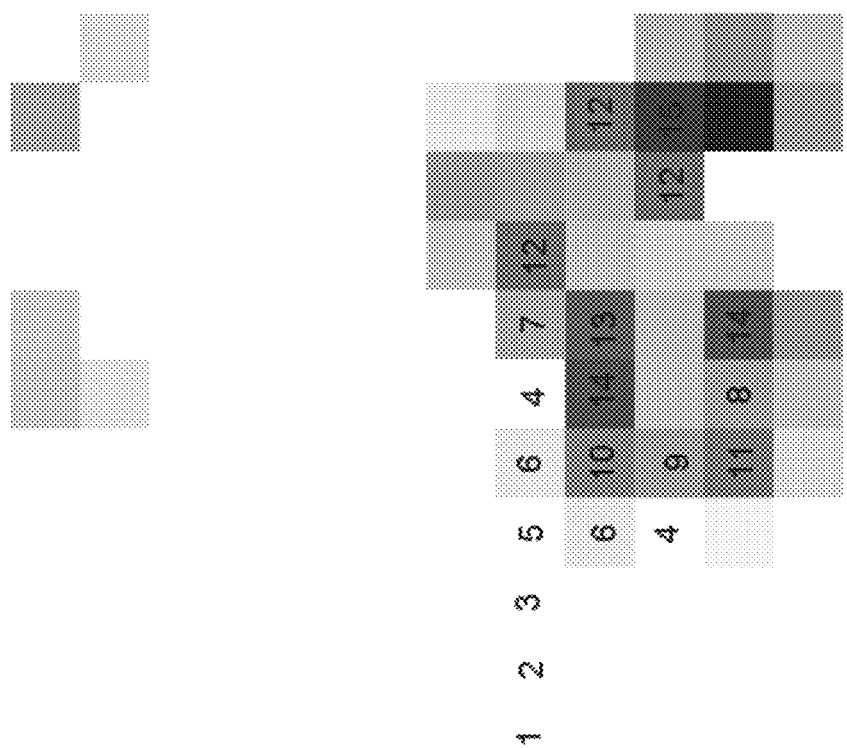
FIG. 10B is a cut out of the same region shown in FIG. 9B as cut out of FIG. 10A.

In FIG. 9A, the brightness of some of the interesting pixels/areas are marked by inclining numbers, with the greater numbers applied at the pixels or areas that have a greater difference between the initial image (FIGS. 4 and 6) and the later image (FIGS. 5 and 7). FIG. 9B is a sectional cut out of that same scene, showing the difference area enlarged. FIG. 10A is the image of FIG. 9A after a contrast enhancement (alternatively a histogram or cut filtering may be used), and FIG. 10B is a cut out of the same region shown in FIG. 9B as cut out of FIG. 10A, showing the difference area enlarged. The contrast enhancement, histogram or cut filtering may include the difference calculating step (see step 7 in FIG. 2) by choosing the according mapping parameters initially. As can be seen with reference to these figures, it becomes clear that the lighter areas represent areas where a low average of differing pixels have been eliminated. Areas which have massively changed or substantially changed (darker areas in this inverted image) are the areas where people or objects have appeared (real change, meant for triggering), while the rest of the scene has stayed mostly unchanged (meant for not triggering), except for some minor differences on strong contrast thresholds caused by slightly inaccurate image superposition (such as image noise natural for electronic cameras that may be widely eliminated by the earlier filtering (see step 5 in FIG. 2)).

Figure 11A:
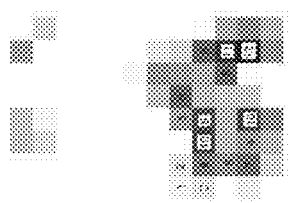
FIGS. 11A and 11B show the same images of FIGS. 9B and 10B, respectively, with the brightness value labels adapted to the new light settings.
Figure 11B:
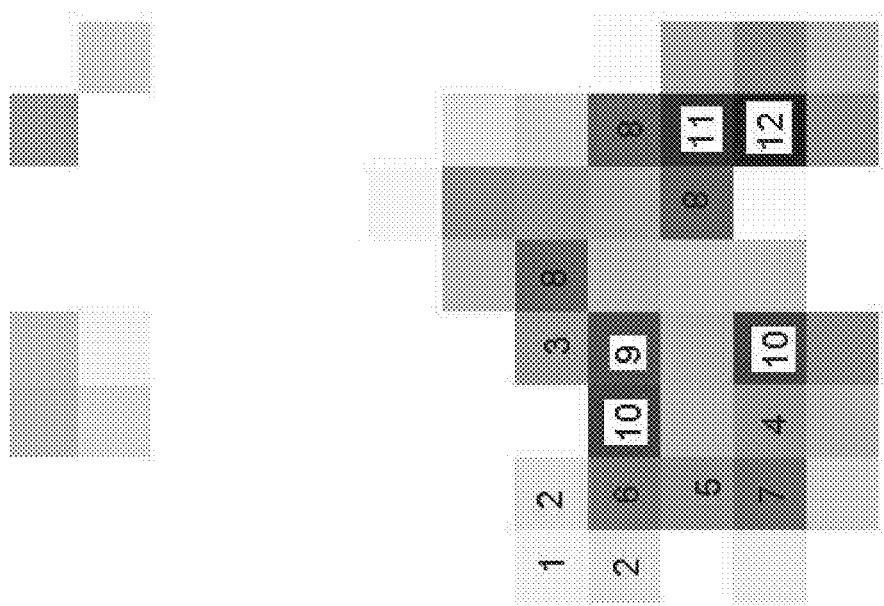

FIGS. 11A, 11B show the same scene of FIGS. 9A, 9B and 10A, 10B with the brightness value labels adapted to the new light settings.

Figure 12:
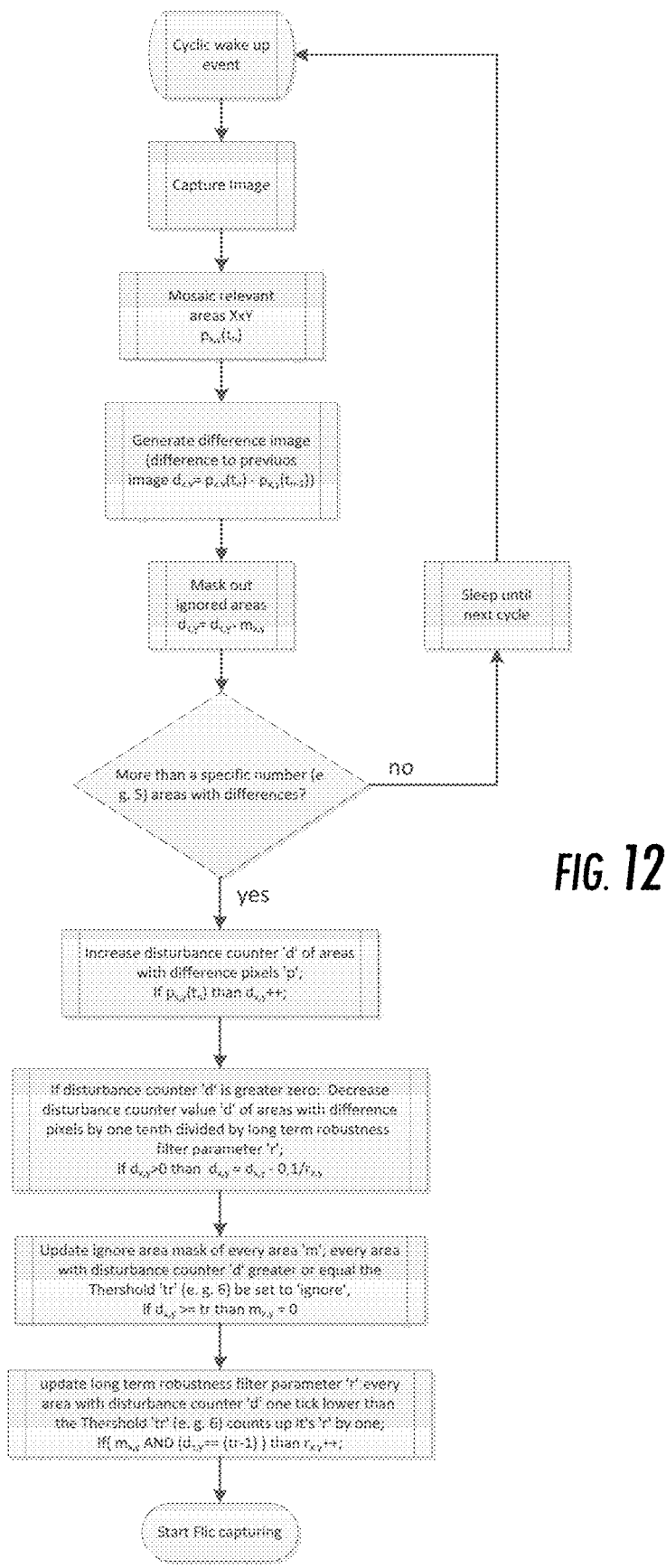
FIG. 12 is a flow chart of a decision process of the data recording system of the present invention.

In cases where there are mosaics remaining which are not uneven or zero or eliminated, the system may assume that something has changed in the scene from the image in FIG. 4 to the image in FIG. 5. The system thus may assume a motion has happened or light conditions have abruptly changed. In cases where nothing has changed, the system may enter a power saving sleep state (again), and this equates to the path following 'no' from the decision block of the flow chart in FIG. 12.

The data recording system may record a fast motion flic or video responsive to a trigger or indication that a threshold difference was determined during the comparison of a frame of captured image data to the previous frame or initial frame of captured image data. This equates to the path following 'yes' from the decision block of the flow chart in FIG. 12. The decision block of FIG. 12 requires a minimum amount of differing mosaics $d_{x,y}$ to limit or substantially preclude triggering responsive to image noise. There may be environmental scenes in which the system becomes disturbed and/or awakened quite often. In such a situation, the data recording system may engage the peripheral sensors, the cameras and data buses very often, which may lead to substantial draining of the vehicle's battery, which may lead to the consequence that the system's or vehicle's battery power management would have to turn off the vehicle data recording system entirely, and possibly very soon, such as within or after about two hours (of being awake very often or all the time).

Figure 13:
FIG. 13 is an exemplary branch in the field of view of a sensor of the data recording system of the present invention.
Figure 14:
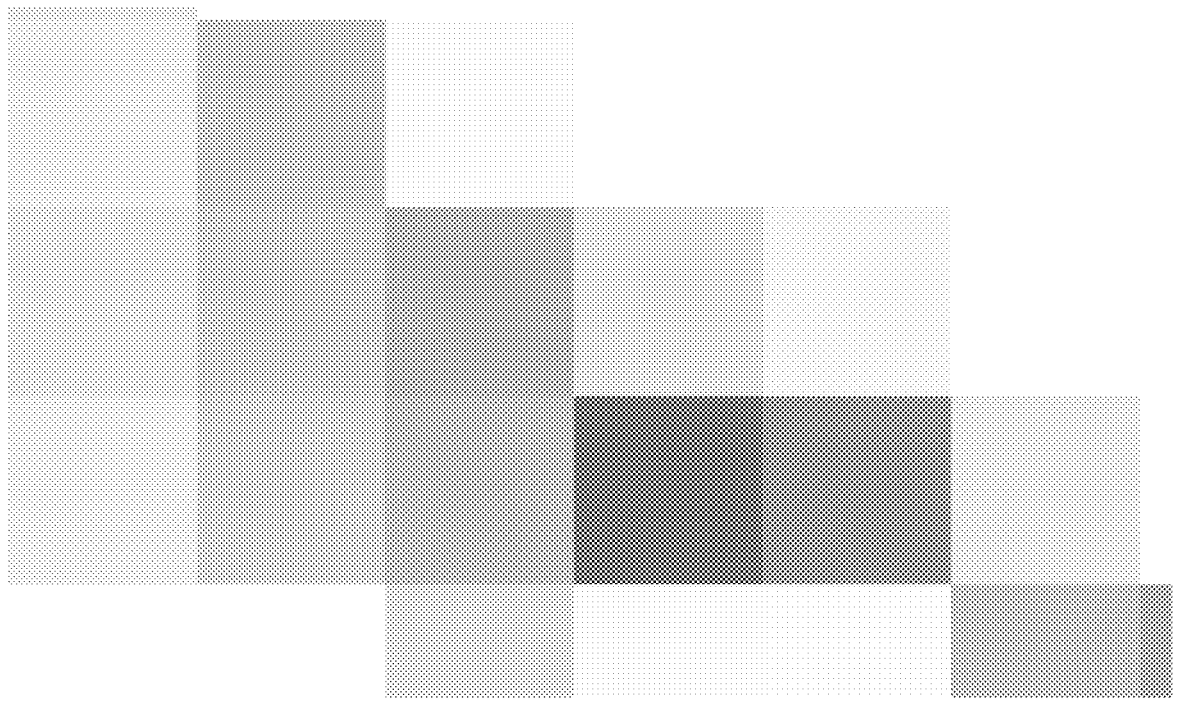
FIG. 14 is a mosaiced difference image showing the differences that may be detected by movement of the branch in FIG. 13.
Figure 15:
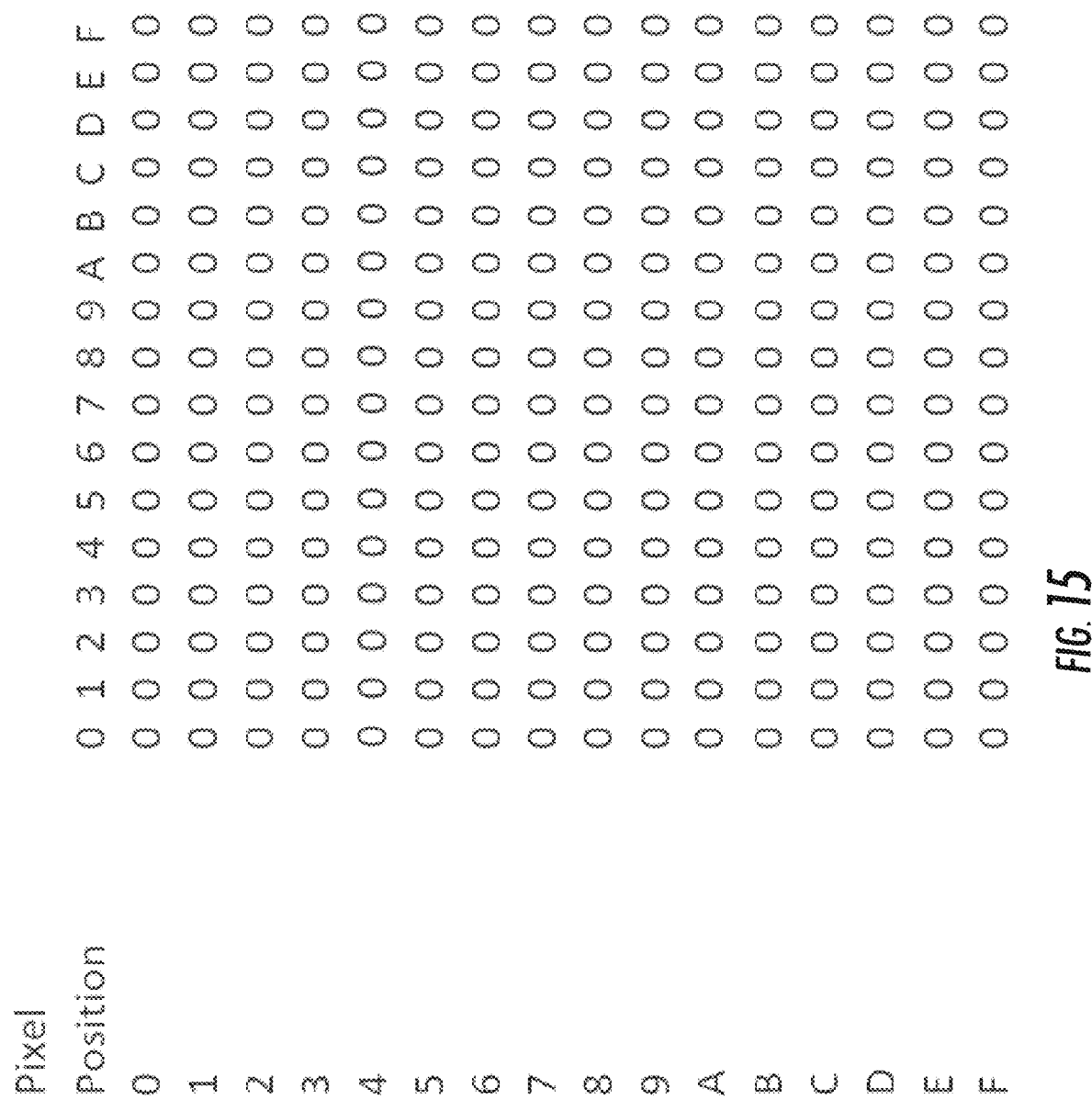
FIG. 15 is a counter table for pixel locations.
Figure 17A:
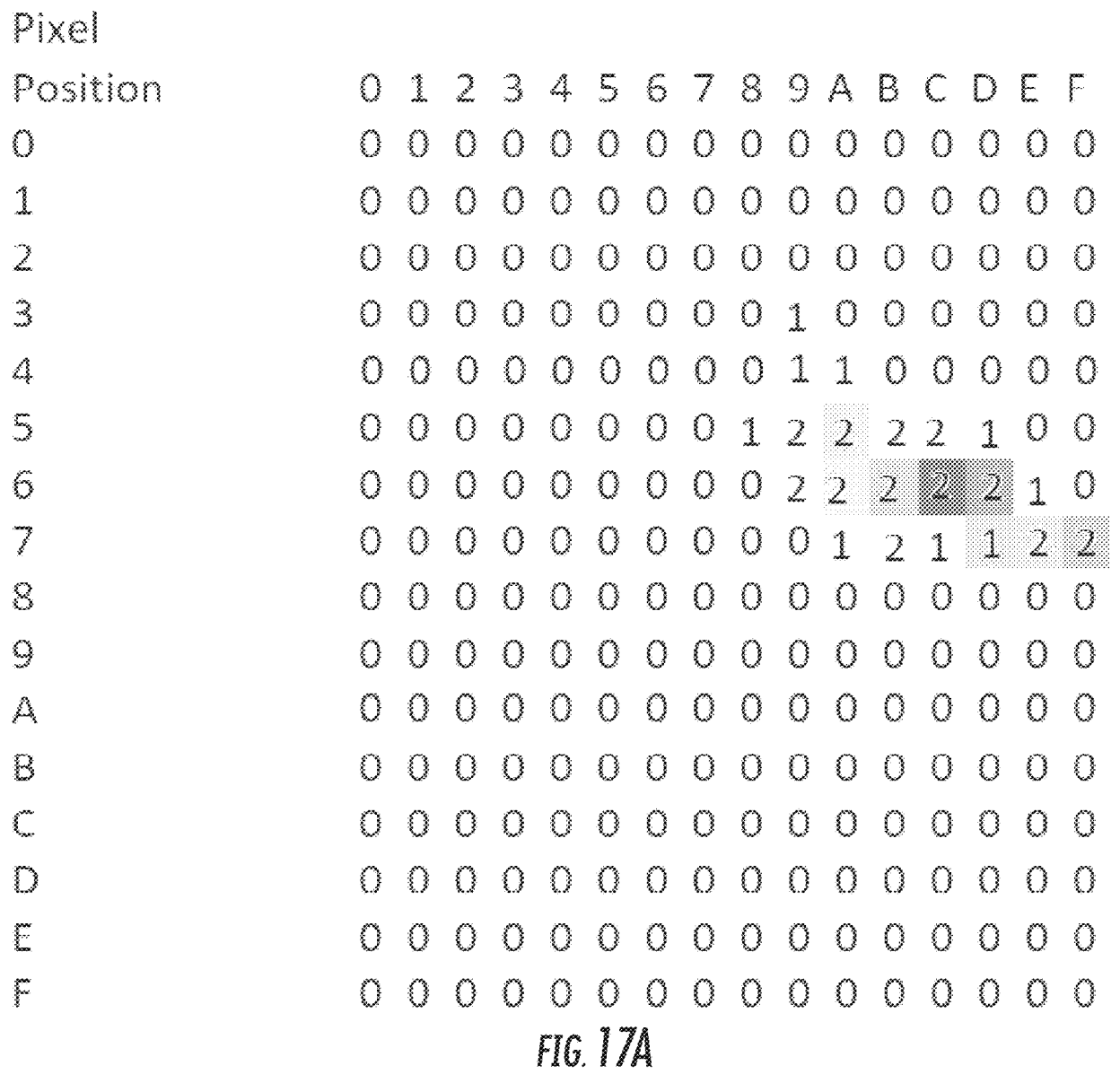

To achieve a less substantial draining of the vehicle battery and to provide a longer stand by time of the recording system's functionality, the data recording system of the present invention may be able to distinguish or sort out or suppress the wake up (input-) events or sources. For example, in a situation where there is a bush or branch within the camera's capturing range or field of view, with the bush or tree or the like having a branch or branches waving in the wind, the branch or branches may be detected as movement of an object within two (or more) consecutive cyclically captured image data sets by the difference comparison. For example, the branch shown in FIG. 13 may appear as mosaiced difference image like the image shown in FIG. 14. The system may be operable to identify that detection area as being the source for false triggering (wake up) by statistical means. The system may have an array of memory in the same size ratio as the pixels on the imager or the same size ratio as the captured mosaic image (see the example shown in FIG. 15 having an (mosaic areas equating) array of 0x0F by 0x0F) called '$d_{x,y}$', with the size X by Y, in the flow chart of FIG. 12. For each pixel or mosaic there may be a value (such as, for example, four bit or the like) storing the disturbance counter 'd' event history of being a pixel or mosaic 'p' differing at the image data difference comparison $p_{x,y}(t_n)-p_{x,y}(t_{n-1})$ when comparing the $p_{0,0}$ (upper left corner of the array) to $p_{x,y}$ (lower right corner of the array). As an example, two consecutive triggerings that may occur due to a waving branch such as like that shown in FIGS. 13 and 14 may influence the disturbance counters $d_{x,y}$ illustrated in FIGS. 16A and 17A having the resulting disturbance counter table entries such as like those shown in FIGS. 16B and 17B accordingly.

The data recording system may include a certain event history counter level (which may be fix or adjusted by algorithm), such as, for example, 6 (or more or less), which leads to the consequence that the according pixel will not be considered (ignored) as a wake up trigger source until falling under the counter level borderline again. Optionally, the system may include an algorithm that may decrease the event history counter level (of one, several or all pixels). This may happen by time, by trigger events or by other difference pixel statistical means. In the flow chart of FIG. 12, for example, there is a threshold 'tr' of the disturbance counter 'd' (equal for all 'p') with the exemplary value 6. That means if one pixel or mosaic's counter is exceeded so as to be involved to trigger the resulting image difference events over a short duration, the pixel or mosaic (if having a disturbance counter greater than the threshold value) may be ignored by setting its masking bit $m_{x,y}$ to zero. By masking the difference images before doing the trigger decision, the specific areas become ignored in determining the triggering. In the example over time the area (x,y positions of $d_{x,y}$) in the image covered by the waving branch would soon have several positions which exceed the value 5, which would result in the system ignoring that area by masking it's pixels or mosaics. Thus, detection of the moving branch would not trigger activation of the video image data capture.

Optionally, another procedure may be to decrease the disturbance event history counter. This is for re-enabling areas which have been masked earlier when their disturbing ratio is diminishing. In the example above, the waving branch may stop waving due to the wind lessening. In the exemplary flow chart of FIG. 12, the disturbance counter $d_{x,y}$ may be diminished by one tenth on every disturbance event (at which a specific pixel or mosaic isn't participating (><0)). Another divisor 'r' counts the events and how often a $d_{x,y}$ has changed from above the threshold 'tr' to below the threshold. The default and minimum of 'r' is 1. As soon as 'r' increases, the disturbance counter will decrease respectively slower according to the term $d_{x,y}=d_{x,y}-0$, $1/r_{x,y}$. When 'r' is 2, 'd' diminishes by one every $20^{th}$ disturbance event, and when 'r' is 3, 'd' diminishes by one every $30^{th}$ disturbance event, and so on. This is provided to reduce or eliminate (masking) disturbance sources which are cyclically present from time to time but not steadily present, such as a waving branch in intermittent wind conditions or a flickering street light, which is only on at night, or the like.

Figure 18:
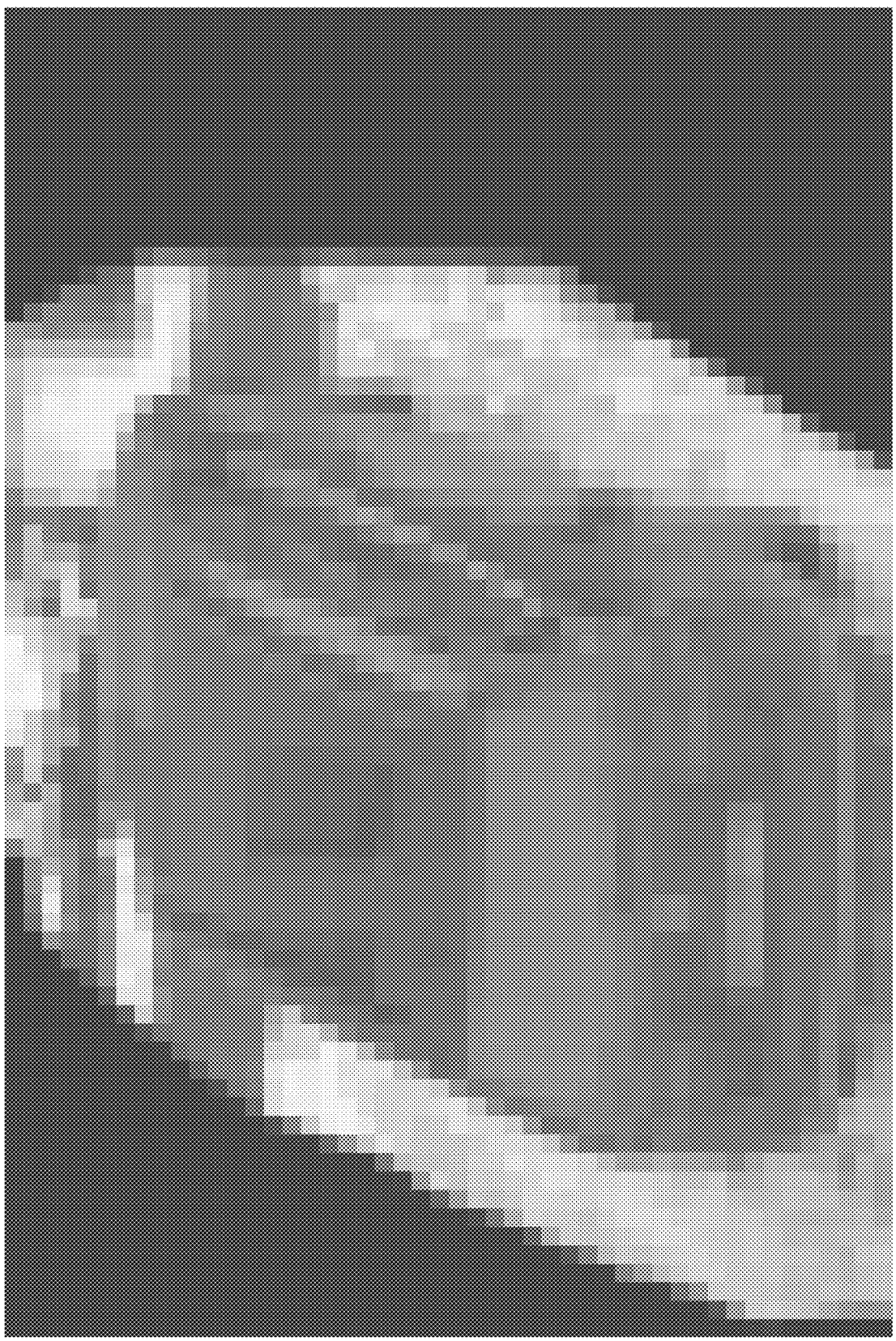
FIG. 18 is a cropped image of the image of FIG. 4.
Figure 19:
FIG. 19 is a mosaiced image of the image of FIG. 18.

To decrease the false case rate and the calculation resource demand, the supervised scenery around the equipped vehicle may be limited by cropping or masking the captured images by a static mask. FIG. 18 shows a cropped image of FIG. 4, with its mosaiced image shown in FIG. 19.

At times when the vehicle is parked close to a crowded pedestrian path, such as a sidewalk at the right of the vehicle, the ultrasound sensors of the vehicle may detect entering and leaving objects (pedestrians) very often (leading to wake up events triggering the cameras to capture the scene), and the system may decide to have a higher robustness to disturbances due to such an (input-) event source. This may be done by changing the inputs' priority level for wake up or by employing a counter or sensitivity state machine or algorithm. The sensitivity may be counted up (less sensitive) when a trigger occurs by a specific input source (or input sensor type class or such). Substantial triggering will lead to a high level of insensitivity. The counter may be counted down over time (such as, for example, the counter may be counted down one increment every hour of a four bit counter). The one or all counter may be reset by a vehicle damage alert event directly followed by an according wake up trigger event. Optionally, the system may employ a learning algorithm in which the initial counter level may lead to an enhanced or optimal balance of system awareness/inactivity and battery life. The system thus may increase the threshold degree of differences that need to be determined before triggering the system, such that a greater difference or change over time is determined before the system will be awakened or triggered.

When the vehicle data recording system is engaged over several days and the vehicle is not driven to charge it's battery, the system may raise the insensitivity level of all sensors more and more and the system's cyclical wake up events may increase time wise (such as, for example, from $t_a+t_i=1$ s to 2 s, 4 s, 8 s, 16 s over to 32 s and so on). After a longer time, such as over one week or the like, the system may be switched off, whereby the cameras may be activated when the vehicle alert or security system engages, such as when triggered by an actually detected hit.

Figure 20:
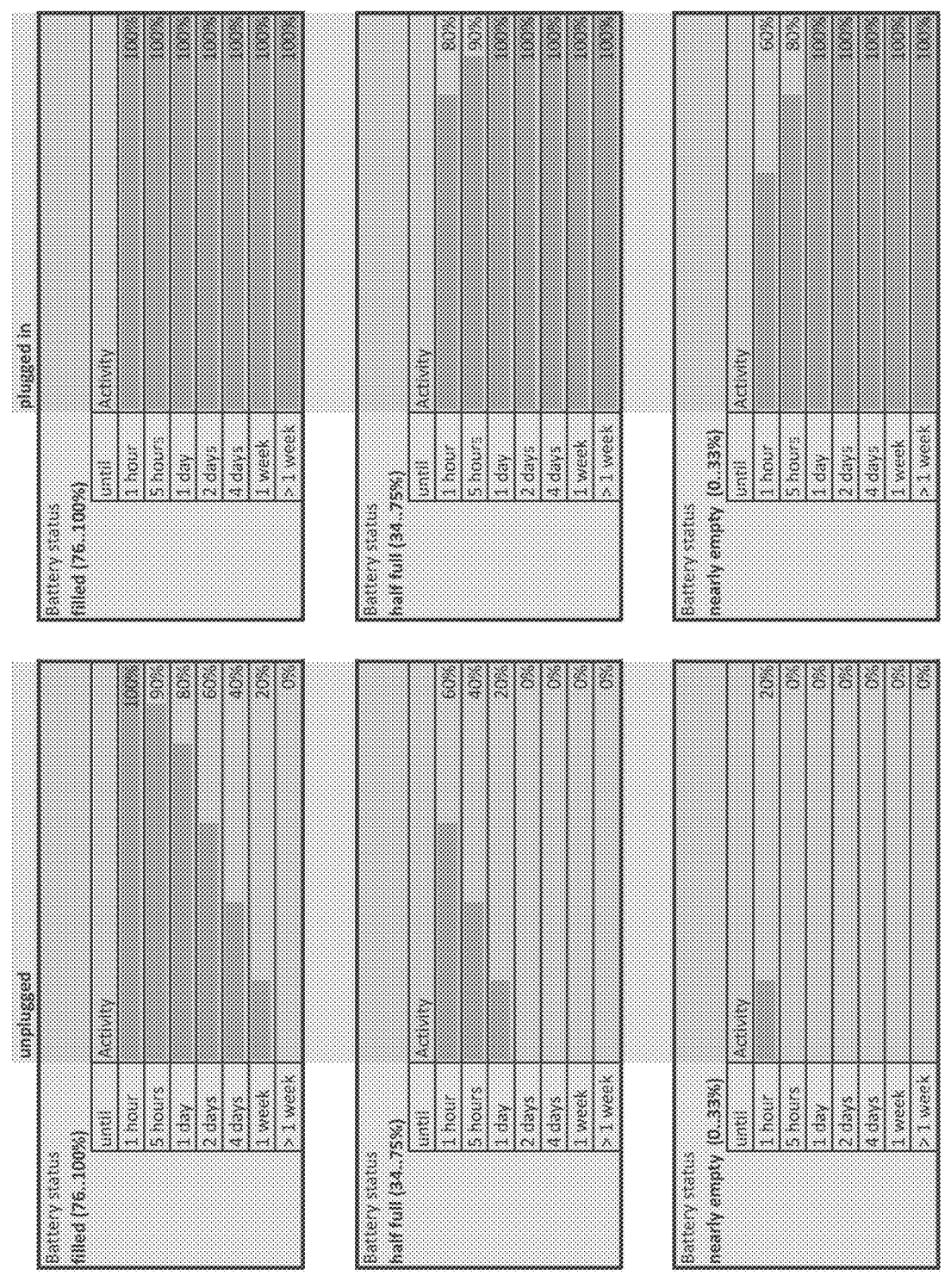

For applications in an electrical vehicle or the like, when the vehicle is plugged in (charging), the data recording system may run or operate in more sensitive (more power consuming) modes as compared to when the vehicle is unplugged. Both are shown in an example of FIG. 20. The activity percentage relates to the cycle times, and less activity equates to longer times of $t_a+t_i$, and higher activity equates to shorter times, adjusted by $t_a$, $t_i$. 100% may mean that the system may have a very short cycle time or even never turns into saving mode but records the scene all the time.

Optionally, the system may include features to increase the use cases, convenience and security of the system. For example, the system may be operable to, at the time a data recording alert is detected, send a text message over a mobile channel or a captured movie via UMTS, LTE or the like (to alert the owner of the vehicle of a triggering event of the data recording system), such as by utilizing aspects of the display and data communication system described in International Publication No. WO 2013/081985, which is hereby incorporated herein by reference in its entirety. The image, images or movie or data set captured by the system responsive to a triggering event (and optionally the current vehicle location as determined by the vehicle GPS) may be stored at a remote server for accessibility by the vehicle's owner or may be stored at a removable storage device as like a SD-card or the like, which may be removed from the vehicle and taken away by the vehicle owner.

Optionally, the vehicle owner may be able to enter settings for backup paths, cycles, modes, trigger sensitivity modes and/or power management modes and/or the like, according to the vehicle/car damage recording system. Optionally, the system may provide specified set up modes adapting the system to the local laws and legal modalities. For example, the system may blur the faces in its records automatically if required by the local laws (or if elected by user set up). Optionally, the actual vehicle location may come from a GPS receiver via a CAN bus of the vehicle or the like. Optionally, the system may trigger other systems or services, such as an alert system that notifies or calls the police, a parking lot guard, security service or the like, responsive to the vehicle being damaged or hit (or responsive to a triggering event). Optionally, the system may detect (via image capture by a camera of the system or vehicle), store and transmit the image of the license plate (or information derived from image processing of image data captured by the camera) of a hit and run vehicle and may additionally transmit such information or image data to the according (called) parking lot guard, security service or police (-man or -station). The vehicle data recording system may be part of a vehicle alarm system, a crash black box, a vehicle system integrity device (or system), a vehicle vision system or remote vehicle security surveillance (service) system and/or the like.

Figure 21:
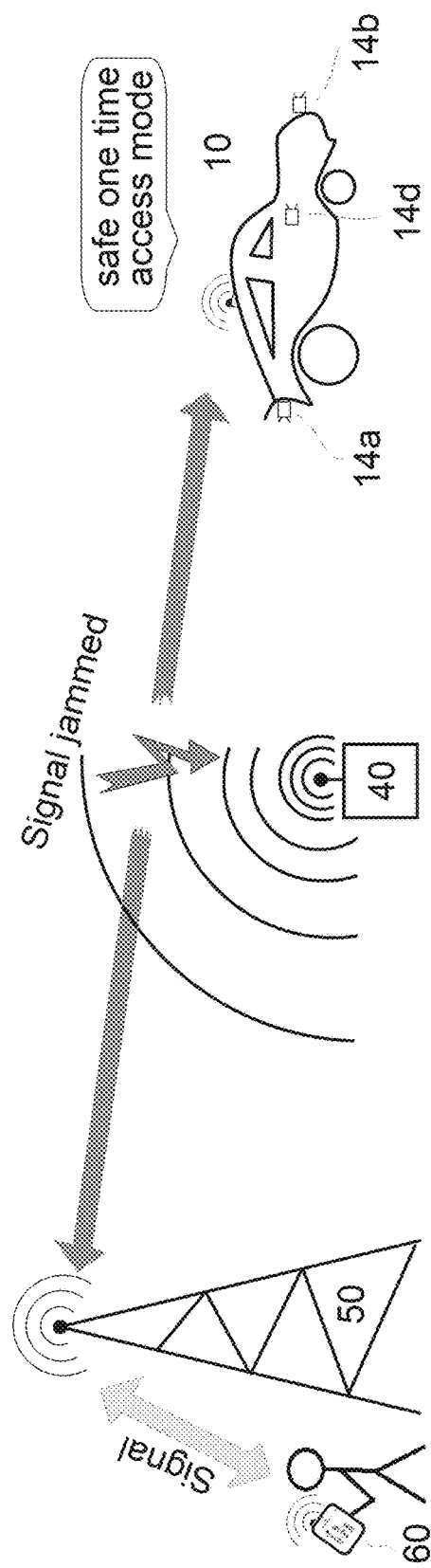
FIG. 21 is a schematic of a jammer attack scenario, where the vehicle is equipped with a jammer detector of the present invention.

As another aspect of the present invention, the vehicle alert system may employ a known (commodity) jammer detector (such as shown, for example, at http://www.shop-alarm.de/GPS_-_GSM_-_WIFI_-_DECT_-_Bluetooth_Stoersender_und_Jammer_Detector.html), such as for any kind of data transmission band jamming the vehicle is using (GPRS, GSM, WLAN, DECT, WEP, UMTS, LTE and near field communication). Jammers may be misused to enable vehicle thefts to overcome the vehicle security systems or to lengthen the time they keep undiscovered, especially for suppressing the outbounding transmissions of vehicle alerts, images or flics to the owner or the police as described above. Jammer detectors are able to detect the presence of jammers 40 in range of the vehicle 10 (FIG. 21). The behavior of the vehicle alert system of the present invention responsive to the detected presence of a jamming device 40 in range may be to disable all usual vehicle access functionalities. That mode may be called a 'safe one time access mode.' By that a 'Keyless Entry/Go' may become disabled, and the vehicle key remote control opening may become disabled, and the vehicle entry access by turning the vehicle key in the door key hole may be disabled as well. The door dead bolts when present may be turned to lock if not done already. FIG. 21 illustrates such a scenario. As shown in FIG. 21, the vehicle may be equipped with such a jammer detector, whereby, if a GSM signal between a GSM tower 50 and the vehicle 10 is jammed (such as by any means or device for jamming or blocking or interfering with such signals), such as by a jammer device 40 at or near the vehicle, the vehicle owner's smart phone (here tablet) or other personal remote communication device may generate the message 'vehicle signal lost' to the user or vehicle owner (such as responsive to a signal indicative of the lost or interrupted signal). The vehicle, responsive to a determination of signal jamming, may fall into or switch to a 'safe one time access mode' to limit or substantially preclude a break in of the vehicle when the signal is being jammed.

As another aspect of the present invention, a smart phone app may be used for displaying the vehicle's safety status, and the app may be set up in a way that in case a cyclic feedback from the vehicle is interrupted or not provided (which may be caused by the presence of a jammer within the vehicle's radio range), the app will signal that the connection has been lost, which may indicate that the vehicle may be in an 'unsafe' or 'endangered' situation. Optionally, the status messages of a plurality of vehicles equipped with such a system may be accessible by parking guards, security or police services. Thus, at times when multiple vehicles report 'connection lost', such a determination or event may be a trigger for elevated scrutiny or security at or to the area where the reported vehicles are located.

As another aspect of the present invention, when the presence of the jammer may be not detectable any more, the vehicle may remain in the 'safe one time access mode', and may not be openable by key or remote device. To unlock the 'safe one time access mode', the driver may have to enter a PUC (personal unlock code). The PUC may be one the driver may have entered earlier, preferably a one time usable PUC may be generated and transmitted by a remote service server (provided by the vision system manufacturer or vendors, OEM, or third party service) to the vehicle or to the driver's mobile device (with unique device ID as unique identification) upon request. The server may only serve the PUC to earlier exclusively dedicated individuals. At the time someone requests a one time PUC, the server may enter a dialog for making sure no unauthorized user is attempting to acquire a PUC. That may be done in a known manner by requesting key data only a dedicated person can know, and these may have been entered earlier. The key data may be, for example, the date of birth, town of birth, maiden name, favorite pet's name, best friend in college or the like.

As another aspect of the present invention, the 'safe one time access mode' may have additional or alternative safety hurdles to overcome before unlocking beside the PUC entry, such as like identifying by dedicating a person's face detection, retina, fingerprint or by body shape classification, such as by utilizing aspects of the systems described in U.S. provisional application Ser. No. 61/842,644, filed Jul. 3, 2013, which is hereby incorporated herein by reference in its entirety.

As another aspect of the present invention, this function may be implemented in conjunction with or incorporated in or may be part of or used in combination with a keyless entry/go access admission system with visual driver identification, such as described in U.S. provisional application Ser. No. 61/845,061, filed Jul. 11, 2013, which is hereby incorporated herein by reference in its entirety.

As another aspect of the present invention, the above vehicle park surveillance system (and optionally the above access admission system) may find use in conjunction with a power lift gate triggering and object collision prevention system, such as described in U.S. patent Ser. No. 14/159, 772, filed Jan. 21, 2014, now U.S. Pat. No. 9,068,390, which is hereby incorporated herein by reference in its entirety.

The Technische Universitat München (TUM) published a solution for preventing pedestrians (as well as animals, cyclists and cars, hereinafter referred to as pedestrians) from hazards due to being hidden behind objects by carrying a transponder (which may be incorporated in a cell phone or the like) and permanently providing the actual position of it (and by that the carrying pedestrian) for being received by vehicle driver assistant systems for warning or actively preventing collisions by braking and assumingly invasive steering (see http://www.tum.de/die-tum/aktuelles/pressemitteilungen/kurz/article/31294/, which is hereby incorporated herein by reference in its entirety). However, the requirement that the pedestrians must always carry a transponder in order to be detected by the driver assistant systems of vehicles is a suboptimal solution.

As another aspect of the present invention, one or more than one vehicles 20*a-f* may be parked at a local area, and may be equipped with the image processing system according the invention, and thus may be operable to detect or determine objects including pedestrians (90 in FIG. 22) by vehicle inherent sensors such as cameras 14*c* (with a field of view 80) in the manner as described above. In the illustrated scenario of FIG. 22, the parked vehicle 20*a* may occlude the pedestrians to the area of view of the camera or sensor 14*b* of the approaching vehicle 22. The vehicles 20*a-f* and 22 may be equipped with the devices according the invention including a ZigBee transmitter 70. The pedestrian's position at the area of sensor or camera view 80 of the vehicle 20*a* next to them would be determined by the vision system of the vehicle 20*a*, which may have been woken up or activated upon the pedestrians entering the scene. The ZigBee transmitters of vehicles 20*b-f* (which may be parked or moving) in the neighborhood may continuously transmit the pedestrian's position to the receiving ZigBee node 70 of the approaching vehicle 22.

Figure 22:
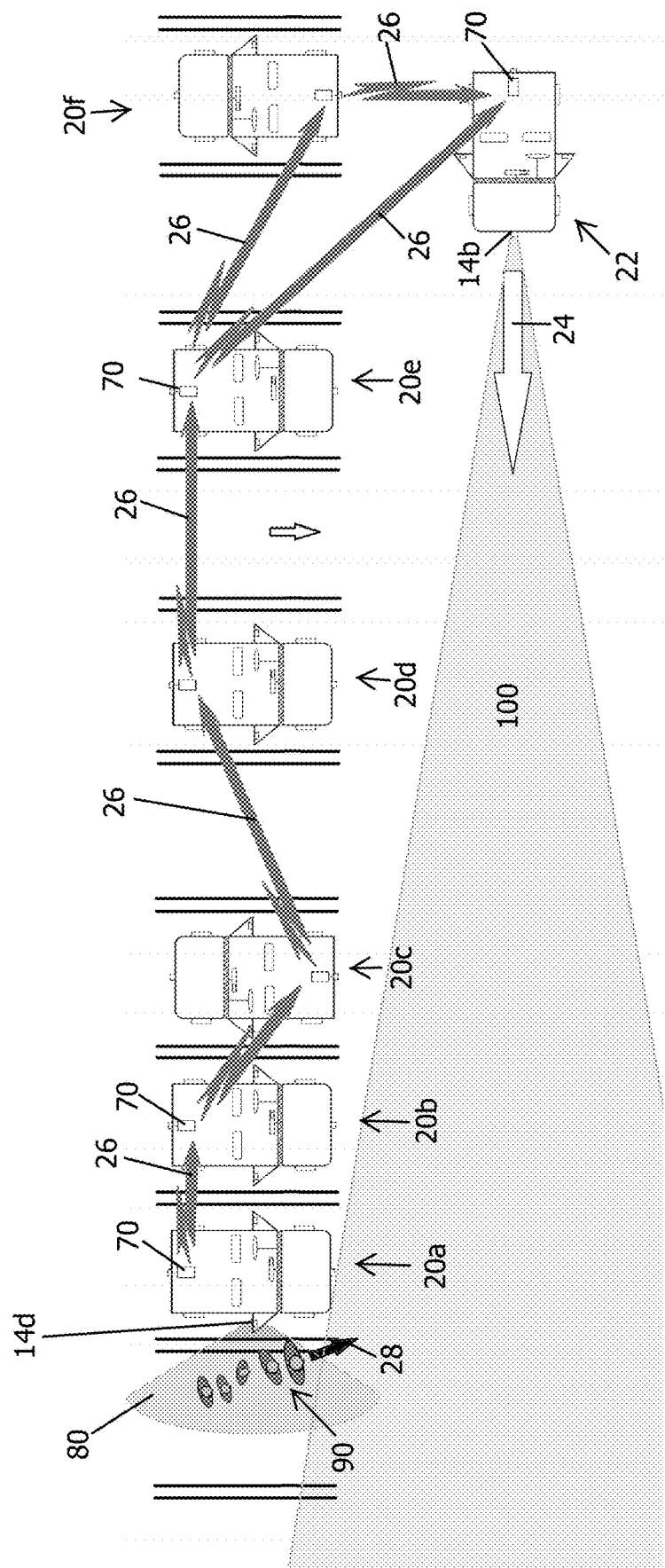
FIG. 22 is a schematic showing a scene where a crowd of pedestrians 90 is about to enter a road with a vehicle 22 approaching, where the pedestrians may be sensed by other vehicles and such information may be communicated to the approaching vehicle in accordance with the present invention.

For giving support to driver assistant system of driving vehicles in that local area, the detection information may not just be transmitted or sent to the specific parked individual vehicle's owner cell phone or the like, but may be sent to the driving vehicles so that local area driver assistant systems are also informed of the location of the detected pedestrian or pedestrians, and such communication may be made via any suitable type or kind of data channel (such as, for example, GPRS, GSM, WLAN, DECT, WEP, SMS, MMS, UMTS or LTE, and/or optically transmitted or communicated or connected inductively or by wire (especially the charging cable data, line of an e-car power outlet connected to a common data grid or the like)). There may be a cloud server, a mobile app, or kind of vehicle inherent app or algorithm for both receiving (from other driving vehicles) and transmitting (to the parked vehicle or vehicles) the data such as shown in above referenced and incorporated International Publication No. WO 2013/081985. The signal may run direct from vehicle to vehicle. The signal may be transmitted via more than one vehicle and/or infrastructure which may act as peers in a (may be temporary) local vehicle and/or infrastructure grid or mesh network or peer to peer network, such as like a ZigBee network or the like. In the example of FIG. 22, the ZigBee device 70 may be attached to or connected to or in communication with the vision system and/or camera (such as camera 14*a* of vision system 12). The driver assistant systems of the driving vehicle(s) 22 (driving in the direction of the white arrow 24 in FIG. 22) will use the received data (gray arrows 26 in FIG. 22) of detected pedestrians 90 occluded by the parked vehicles (and thus not in the area of view 100 of the driving vehicle 22) and especially their detected position and walking direction (black arrow 28 in FIG. 22) to determine potential collision hazards to the pedestrians which may be occluded from the driving vehicle's view 100 and optional other vehicle sensors. Responsive to a determination that the approaching or driving vehicle 22 may collide with the pedestrian(s) as the pedestrian(s) move out from behind the parked vehicle and into the path of travel of the approaching vehicle, the system of the approaching vehicle may generate an alert to the driver to warn the driver of the (as yet) not viewable pedestrians and their approach to the path of travel of the driven vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592 and/or U.S. patent applications, Ser. No. 14/163,325, filed Jan. 24, 2014, and published on Jul. 31, 2014 as U.S. Patent Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published on Jun. 19, 2014 as U.S. Patent Publication No. US-2014-0168437; Ser. No. 14/098,817, filed Dec. 6, 2013, and published on Jun. 19, 2014 as U.S. Patent Publication No. US-2014-0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published on Jan. 23, 2014 as U.S. Patent Publication No. US-2014-0025240; Ser. No. 13/942,753, filed Jul. 16, 2013, and published on Jan. 30, 2014 as U.S. Patent Publication No. US-2014-0028852; Ser. No. 13/927,680, filed Jun. 26, 2013, and published Jan. 2, 2014 as U.S. Patent Publication No. US-2014-0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, and published Aug. 29, 2013 as U.S. Patent Publication No. US-2013-0222593; Ser. No. 13/851,378, filed Mar. 27, 2013, now U.S. Pat. No. 9,319,637; Ser. No. 13/848,796, filed Mar. 22, 2012, and published Oct. 24, 2013 as U.S. Patent Publication No. US-2013-0278769; Ser. No. 13/847,815, filed Mar. 20, 2013, and published Oct. 31, 2013 as U.S. Patent Publication No. US-2013-0286193; Ser. No. 13/800,697, filed Mar. 13, 2013, now U.S. Pat. No. 10,182,228; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published on Aug. 22, 2013 as U.S. Patent Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publication No. US-2013-0002873, and/or U.S. provisional applications, Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/886,883, filed Oct. 4, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/766,883, filed Feb. 20, 2013; and/or Ser. No. 61/760,366, filed Feb. 4, 2013, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. patent application Ser. No. 12/508,840, filed Jul. 24, 2009, and published Jan. 28, 2010 as U.S. Pat. Publication No. US 2010-0020170, and/or U.S. patent application Ser. No. 13/534,657, filed Jun. 27, 2012, and published Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. pat. applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications, Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular vision system, said vehicular vision system comprising:
    at least one camera disposed at a vehicle equipped with said vehicular vision system, wherein said at least one camera has a field of view exterior the equipped vehicle and is operable to capture frames of image data;

a control comprising at least one data processor, wherein image data captured by said at least one camera is processed at said control;

wherein said vehicular vision system is operable to record frames of image data captured by said at least one camera;

wherein said vehicular vision system, responsive to the equipped vehicle being in a parked state, controls said at least one camera to capture frames of image data at a first capture rate, and wherein said vehicular vision system does not record frames of image data captured by said at least one camera at the first capture rate;

wherein, responsive to processing at said control of captured image data when the vehicle is in the parked state, said vehicular vision system compares a frame of captured image data to at least one previous frame of captured image data to determine change at an area of the frames of captured image data that is indicative of movement at a region of the field of view of said at least one camera;

wherein, when the vehicle is in the parked state and when said at least one camera is capturing frames of image data at the first capture rate and when said vehicular vision system is not recording frames of captured image data, and responsive to determination of change at the area of the frames of captured image data beyond a threshold degree of change, (i) said vehicular vision system controls said at least one camera to capture frames of image data at a second capture rate that is higher than the first capture rate and (ii) said vehicular vision system starts recording frames of image data captured by said at least one camera at the second capture rate;

wherein, responsive to determination of change at the area of the frames of captured image data beyond the threshold degree of change, said vehicular vision system updates a disturbance counter associated with the area;

wherein, responsive to the disturbance counter satisfying a threshold value, said vehicular vision system updates an ignore area mask for the area;

wherein, responsive to updating the ignore area mask for the area, image data captured by said at least one camera at the area in subsequent frames of captured image data is not compared at said control to at least one previous frame of captured image data; and further comprising at least one non-imaging sensor disposed at the equipped vehicle, wherein said at least one non-imaging sensor has a field of sensing exterior of the equipped vehicle and is operable to capture sensor data, and wherein sensor data captured by the at least one non-imaging sensor is processed at said control, and wherein, responsive to processing at said control of captured sensor data when the vehicle is in the parked state, said vehicular vision system determines a change in the captured sensor data that is indicative of movement in the field of sensing of said at least one non-imaging sensor, and wherein, when the vehicle is in the parked state and when said at least one camera is capturing frames of image data at the first capture rate and when said vehicular vision system is not recording captured images, and responsive to determination, via processing of captured sensor data at said control, of change in the captured sensor data beyond another threshold degree of change, (i) said vehicular vision system increases the capture rate to the second capture rate, (ii) said at least one camera captures frames of image data at the second capture rate and (iii) said vehicular vision system starts recording frames of image data captured at the second capture rate.

2. The vehicular vision system of claim 1, wherein, responsive to determination of said threshold degree of change, said vehicular vision system activates at least one other camera or sensor to capture data and said vehicular vision system records information captured by said at least one other camera or sensor.

3. The vehicular vision system of claim 1, wherein, responsive to determination, via processing of sensor data at said control, of change in the captured sensor data beyond the other threshold degree of change, said vehicular vision system updates a sensitivity counter associated with the at least one non-imaging sensor, and wherein the other threshold degree of change is associated with the sensitivity counter.

4. The vehicular vision system of claim 1, wherein the threshold degree of change is dependent upon an amount of time that the vehicle has been in the parked state.

5. The vehicular vision system of claim 4, wherein the threshold degree of change increases as the amount of time that the vehicle has been in the parked state increases.

6. The vehicular vision system of claim 1, wherein said camera comprises an imaging array having multiple rows and columns of photosensing pixels, and wherein each pixel of said imaging array has an individual disturbance counter, and wherein, responsive to a respective disturbance counter of a respective pixel satisfying the threshold value, said vehicular vision system updates the ignore area mask for that respective pixel so that data captured by that pixel in subsequent frames of captured image data is not compared at said control to at least one previous frame of captured image data.

7. The vehicular vision system of claim 6, wherein, responsive to the determination of change at the area of the frames of captured image data beyond the threshold degree of change, said vehicular vision system decreases the disturbance counters for other areas of said imaging array that are not associated with the area.

8. The vehicular vision system of claim 1, wherein said vehicular vision system, responsive to a determination, via processing at said control of frames of image data captured by said at least one camera, of a pedestrian in the field of view of said at least one camera, generates a signal to other vehicles indicative of the determined pedestrian.

9. The vehicular vision system of claim 1, wherein said vehicular vision system, responsive to determination of an interruption in a signal communicated to said vehicular vision system from a remote transmitter, at least temporarily disables an access system of the equipped vehicle.

10. The vehicular vision system of claim 1, wherein said at least one camera comprises a plurality of cameras having respective exterior fields of view, said cameras comprising at least a part of a surround view system of the equipped vehicle.

11. The vehicular vision system of claim 1, wherein said at least one camera comprises a forward viewing camera of the equipped vehicle, and wherein frames of image data captured by said forward viewing camera when the vehicle is operating are processed at said control for at least one of (i) a headlamp control system of the equipped vehicle, (ii) a lane change assistance system of the equipped vehicle and (iii) a lane departure warning system of the equipped vehicle.

12. The vehicular vision system of claim 1, wherein said at least one camera comprises a rearward viewing camera of the equipped vehicle, and wherein frames of image data captured by said rearward viewing camera when the vehicle is operating are processed at said control for at least one of (i) a rear backup assist system of the equipped vehicle and (ii) a surround view system of the equipped vehicle.

13. The vehicular vision system of claim 1, wherein, responsive to the determination of change at the area of the frames of captured image data beyond the threshold degree of change, said vehicular vision system increases the disturbance counter associated with the area.

14. A method for recording image data captured by a vehicular vision system, the method comprising:
providing at least one camera disposed at a vehicle equipped with the vehicular vision system so as to have a field of view exterior the equipped vehicle;
providing a control having at least one data processor;
capturing, by the at least one camera disposed at the equipped vehicle when the vehicle is in a parked state, multiple frames of image data at a first capture rate;
comparing, at the control, a second frame of captured image data to a first frame of captured image data that was captured prior to a second frame of captured image data;
responsive to the comparison of the second frame of captured image data to the first frame of captured image data, determining, at the control, a change at an area of the first and second frames of captured image data that is indicative of a movement at a region of the field of view of the at least one camera;
responsive to determining the change at the area of the first and second frames of captured image data, determining, at the control, whether the change at the area of the frames of captured image data is greater than a threshold degree of change;
responsive to determining that the change at the area of the first and second frames of captured image data is beyond the threshold degree of change:
capturing, by the at least one camera, multiple frames of image data in a field of view exterior the equipped vehicle at a second capture rate that is greater than the first capture rate;
recording, by the vehicular vision system, frames of image data captured by the at least one camera at the second capture rate;
updating, by the vehicular vision system, a disturbance counter associated with the area at which the change is determined;
determining, by the vehicular vision system, whether the disturbance counter satisfies a threshold value; and
responsive to the disturbance counter satisfying the threshold value, updating, by the vehicular vision system, an ignore area mask to include the area at which the change is determined;
after updating the ignore area mask to include the area at which the change is determined, capturing a third frame of image data;
comparing, at the control, the third frame of captured image data to a fourth frame of captured image data that was captured prior to the third frame of captured image data;
when comparing the third frame of captured image data to the fourth frame of captured image data, ignoring image data at areas of the frames of captured image data included in the ignore area mask;
determining, at the control, and via the comparison of the third frame of captured image data to the fourth frame of captured image data, change at another area of the frames of captured image data that is indicative of movement at another region of the field of view of the at least one camera; and
further comprising:
capturing sensor data by at least one non-imaging sensor disposed at the equipped vehicle and having a field of sensing exterior the equipped vehicle;
determining, at the control, a change in the captured sensor data that is indicative of movement in the field of sensing of the at least one non-imaging sensor;
responsive to determining the change in the captured sensor data, determining, at the control, whether the determined change in the captured sensor data is beyond another threshold degree of change;
responsive to determining that the change in the captured sensor data is beyond the other threshold degree of change:
capturing, by the at least one camera, frames of image data at the second capture rate; and
recording, by the vehicular vision system, frames of image data captured by the at least one camera at the second capture rate.

15. The method of claim 14, wherein the first frame of captured image data and the fourth frame of captured image data are the same frame of captured image data.

16. The method of claim 14, wherein, responsive to determining that the change at the area of the frames of captured image data is beyond the threshold degree of change, activating at least one other camera or sensor, capturing data by the at least one other camera or sensor, and recording information captured by the at least one other camera or sensor.

17. The method of claim 14, comprising, responsive to determination that the change in the captured sensor data is beyond the other threshold degree of change, updating, by the vehicular vision system, a sensitivity counter associated with the at least one non-imaging sensor, wherein the other threshold degree of change is associated with the sensitivity counter.

18. The method of claim 14, comprising adjusting the threshold degree of change based upon an amount of time the vehicle has been in the parked state.

19. The method of claim 18, comprising increasing the threshold degree of change as the amount of time the vehicle has been in the parked state increases.

20. The method of claim 14, wherein each pixel of frames of captured image data has an individual disturbance counter, and wherein the method further comprises: determining, at the control, whether a respective disturbance counter of a respective pixel satisfies the threshold value; and responsive to determining the respective disturbance counter of the respective pixel satisfies the threshold value, updating, at the control, the ignore area mask to include the respective pixel.

21. The method of claim 20, further comprising, responsive to determining that the change at the area of the frames of captured image data is beyond the threshold degree of change, decreasing the disturbance counters for areas not included in the ignore area mask.

22. The method of claim 14, further comprising, responsive to determining that the change at the area of the frames of captured image data is beyond the threshold degree of change, increasing, at the control, the disturbance counter associated with the area.

23. A vehicular vision system, said vehicular vision system comprising:

at least one camera disposed at a vehicle equipped with said vehicular vision system, wherein said at least one camera has a field of view exterior the equipped vehicle and is operable to capture frames of image data;

a control comprising at least one data processor, wherein image data captured by said at least one camera is processed at said control;

wherein said vehicular vision system is operable to record frames of image data captured by said at least one camera;

wherein said vehicular vision system, responsive to the equipped vehicle being in a parked state, controls said at least one camera to capture frames of image data at a first capture rate, and wherein said vehicular vision system does not record frames of image data captured by said at least one camera at the first capture rate;

wherein, responsive to processing at said control of captured image data when the vehicle is in the parked state, said vehicular vision system compares a frame of captured image data to at least one previous frame of captured image data to determine change at an area of the frames of captured image data that is indicative of movement at a region of the field of view of said at least one camera;

wherein, when the vehicle is in the parked state and when said at least one camera is capturing frames of image data at the first capture rate and when said vehicular vision system is not recording frames of captured image data, and responsive to determination of change at the area of the frames of captured image data beyond a threshold degree of change, (i) said vehicular vision system controls said at least one camera to capture frames of image data at a second capture rate that is higher than the first capture rate and (ii) said vehicular vision system starts recording frames of image data captured by said at least one camera at the second capture rate;

wherein the threshold degree of change is dependent upon an amount of time that the vehicle has been in the parked state;

wherein, responsive to determination of change at the area of the frames of captured image data beyond the threshold degree of change, said vehicular vision system increases a disturbance counter associated with the area;

wherein, responsive to the disturbance counter satisfying a threshold value, said vehicular vision system updates an ignore area mask for the area;

wherein, responsive to updating the ignore area mask for the area, image data captured by said at least one camera at the area in subsequent frames of captured image data is not compared at said control to at least one previous frame of captured image data; and further comprising at least one non-imaging sensor disposed at the equipped vehicle, wherein said at least one non-imaging sensor has a field of sensing exterior of the equipped vehicle and is operable to capture sensor data, and wherein sensor data captured by the at least one non-imaging sensor is processed at said control, and wherein, responsive to processing at said control of captured sensor data when the vehicle is in the parked state, said vehicular vision system determines a change in the captured sensor data that is indicative of movement in the field of sensing of said at least one non-imaging sensor, and wherein, when the vehicle is in the parked state and when said at least one camera is capturing frames of image data at the first capture rate and when said vehicular vision system is not recording captured images, and responsive to determination, via processing of captured sensor data at said control, of change in the captured sensor data beyond another threshold degree of change, (i) said vehicular vision system increases the capture rate to the second capture rate, (ii) said at least one camera captures frames of image data at the second capture rate and (iii) said vehicular vision system starts recording frames of image data captured at the second capture rate.

* * * * *

UNITED STATES PATENT AND TRADEMARK OFFICE
CERTIFICATE OF CORRECTION

| | |
|---|---|
| PATENT NO. | : 10,523,904 B2 |
| APPLICATION NO. | : 16/380438 |
| DATED | : December 31, 2019 |
| INVENTOR(S) | : Hossam Mahmoud et al. |

Page 1 of 1

It is certified that error appears in the above-identified patent and that said Letters Patent is hereby corrected as shown below:

In the Specification

Column 5
Line 4, "to and inactive" should be --$t_a$ and inactive--

Signed and Sealed this
Twenty-eighth Day of January, 2020

Andrei Iancu
*Director of the United States Patent and Trademark Office*